(12) United States Patent
Mukherjee et al.

(10) Patent No.: US 6,466,978 B1
(45) Date of Patent: Oct. 15, 2002

(54) MULTIMEDIA FILE SYSTEMS USING FILE MANAGERS LOCATED ON CLIENTS FOR MANAGING NETWORK ATTACHED STORAGE DEVICES

(75) Inventors: Sarit Mukherjee, Mount Laurel; Ibrahim Kamel, Monmouth Junction, both of NJ (US); Prasant Mohapatra, Beaverton, OR (US)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/362,819

(22) Filed: Jul. 28, 1999

(51) Int. Cl.[7] .............................................. G06F 15/173
(52) U.S. Cl. ...................................... 709/225; 709/224
(58) Field of Search ................................. 709/216, 217, 709/224, 225, 227, 229, 232, 226, 104; 370/230, 231

(56) References Cited

U.S. PATENT DOCUMENTS

| 5,701,465 | A | * | 12/1997 | Baugher et al. ............. 370/231 |
| 5,920,700 | A | * | 7/1999 | Gordon et al. .............. 709/226 |
| 6,275,471 | B1 | * | 8/2001 | Bushmitch et al. ......... 370/230 |
| 6,282,561 | B1 | * | 8/2001 | Jones et al. ................. 709/104 |

FOREIGN PATENT DOCUMENTS

| EP | 0 915 598 A2 | 5/1999 |
| EP | 0 932 280 A2 | 7/1999 |

OTHER PUBLICATIONS

Cambridge, "Operating System For Distributed Multimedia Applications; A Survey Of Current Research," Tatjana Burkow 1994, See sections 2.6 and 4.2. Note information on admission control system and swift disk system.

Jiang/Mohaptra, "An Agressive Admission Control Scheme For Multimedia Servers," Copyright 1997, Note the use of determination algorithms to ensure fulfilment of requests.
Panasonic, "Autonomous Disks: The Building Block For A Scalable Distributed File System," Copyright 1999, Authors Akinlar, Aref, Kamel, Mukherjee. Note the use of a configuration manager running on a cient or on an autonomous disk. Note also the use of admission control being run by the data manager and the file structure in Section 3.
A. Acharya, M. Uysal, and J. Saltz, "Active Disks," Int. Conf. on the Architectural Support for Programming Languages and Operating Systems, 1999.
H. Aine, "The CentraVision File System," MountainGate White Paper, Aug. 1997 Available at http://www.mountaingate.com.

(List continued on next page.)

*Primary Examiner*—Le Hien Luu
(74) *Attorney, Agent, or Firm*—Harness, Dickey & Pierce, P.L.C.

(57) ABSTRACT

A multi-media file system for conmmunicating information between a multi-media client and a network storage device over a network. The file system includes a cluster that comprises one cluster manager and at least one file manager with each network storage device. The cluster manager is located on a client, includes an admission controller for controlling the admission of a request from a client for a file operation upon a selected file. A network bandwidth request from the admission controller is responded to by a network status determiner included in the cluster manager. The network status determiner determines the available network bandwidth. Each file manager is located on one of the clients. The file managers manage file maintenance procedures of corresponding files located on the network storage device. Each file manager includes a disk status determiner for determining the available disk bandwidth. The disk status determiner responds to a request from the admission controller.

44 Claims, 24 Drawing Sheets

OTHER PUBLICATIONS

D.P. Anderson, Y. Osawa, and R. Govindan, "A File System for Continuous Media," *ACM Trans. on Computer Systems*, pp. 311–337, Nov. 1992.

T.E. Anderson, M.D. Dahlin, J.M. Neefe, D.A. Patterson, D.S. Roselli, and R.Y. Wang, "Serverless Network File Systems," *ACM Trans. on Computer Systems*, Feb. 1996.

W.J. Bolosky, R.P. Fitzgerald, J.R. Douceur, "Distributed Schedule Management in the Tiger Video Server," *ACM Symposium on Operating System Principles*, 1997.

P.M. Chen, E.K. Lee, G.A. Gibson, R.H. Katz, and D.A. Patterson, "RAID: High–Performance, Reliable Secondary Storage," *ACM Computing Surveys*, pp. 145–185, Jun. 1994.

DataDirect Networks, The Next Generation of Network Computing, 1998. Available at http://www.datadirectnet.com.

G.A. Gibson, et al., "Filesystems for Network–Attached Secure Disks," Tech. Report CMU–CS–97–118, Carnegie Mellon University, Jul. 1997. Available at http://www.cs.cmu.edu/Web/Groups/NASD.

G.A. Gibson, et al., "A Case for Network–Attached Secure Disks,"Tech. Report CMU–CS–96–142, Carnegie Mellon University, Jun. 1996. Available at http://www.cs.smu.edu/Web/Groups/NASD.

H. Kaneko and J.A. Stankovic, "A Multimedia Server on the Spring Real–Time System," Tech. Report 96–11, UMass Computer Science Department, 1996.

A. Molano, K. Juvva, and Rajkumar, "Real–Time File Systems: Guaranteeing Timing Constraints for Disk Accesses in RT–Mach," *Real–Time System Symposium*, 1997.

A.K. Parekh and R.G. Gallager, "A Generalized Processor Sharing Approach to Flow Control in Integrated Services Networks: The Multiple Node Case," *IEEE Trans. on Networking*, pp. 137–150, Apr. 1994.

E. Riedel and G.A. Gibson, "Active Disks—Remote Execution for Network–Attached Storage," Tech. Report CMU–CS–97–198, Carnegie Mellon University, 1997.

P.J. Shenoy, P. Goyal, S.S. Rao, and H. M. Vin, "Symphony: An Integrated Multimedia File System," *ACM Sigmetrics Conference on Modeling and Evaluation of Computer Systems*, 1998.

S.R. Soltis, G.M. Erickson, K.W. Preslan, M.T. O'Keefe, and T.M. Ruwart, "The Global File System: A File System for Shared Disk Storage," Submitted to the *IEEE Trans. on Parrallel and Distributed Systems*.

J.A. Stankovic and K. Ramamritham, "The Spring Kernel: A New Paradigm for Real–Time Systems," *IEEE Software*, pp. 62–72, May 1991.

C.A. Thekkath, T. Mann, and E.K. Lee, "Frangipani: A Scalable Distributed File System," *ACM Symposium on Operating System Principles*, 1997.

F.A. Tobagi, J. Pang, R. Baird and M. Gang, "Streaming RAID: A Disk Storage System for Video and Audio Files," *Proc. of ACM Multimedia*, pp. 393–400, 1993.

M. Vernick, C. Venkatramani, and T. Chiueh, "Adventures in Building the Stony Brook Video Server," *Proc. of ACM Multimedia*, 1996.

\* cited by examiner

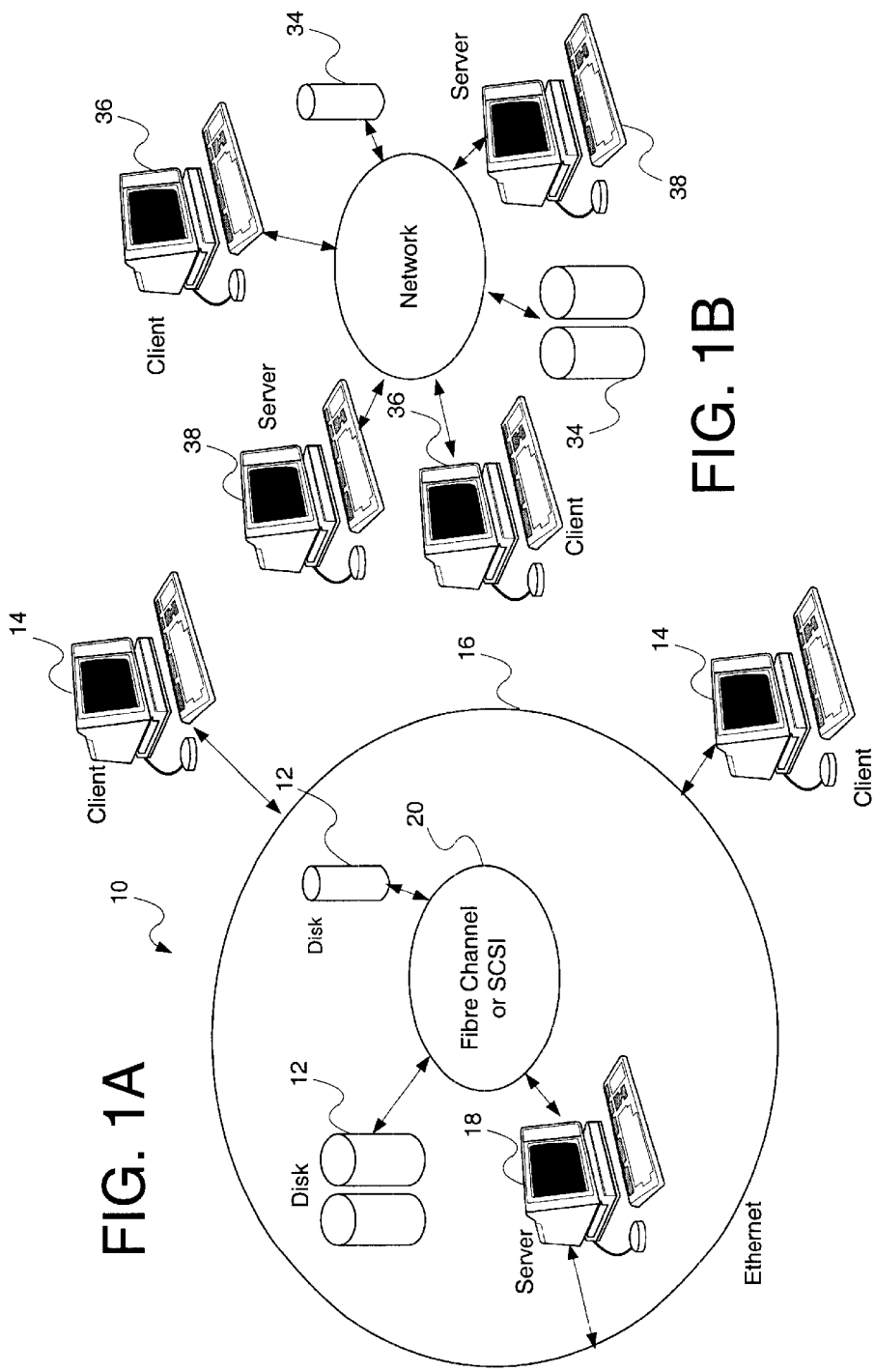

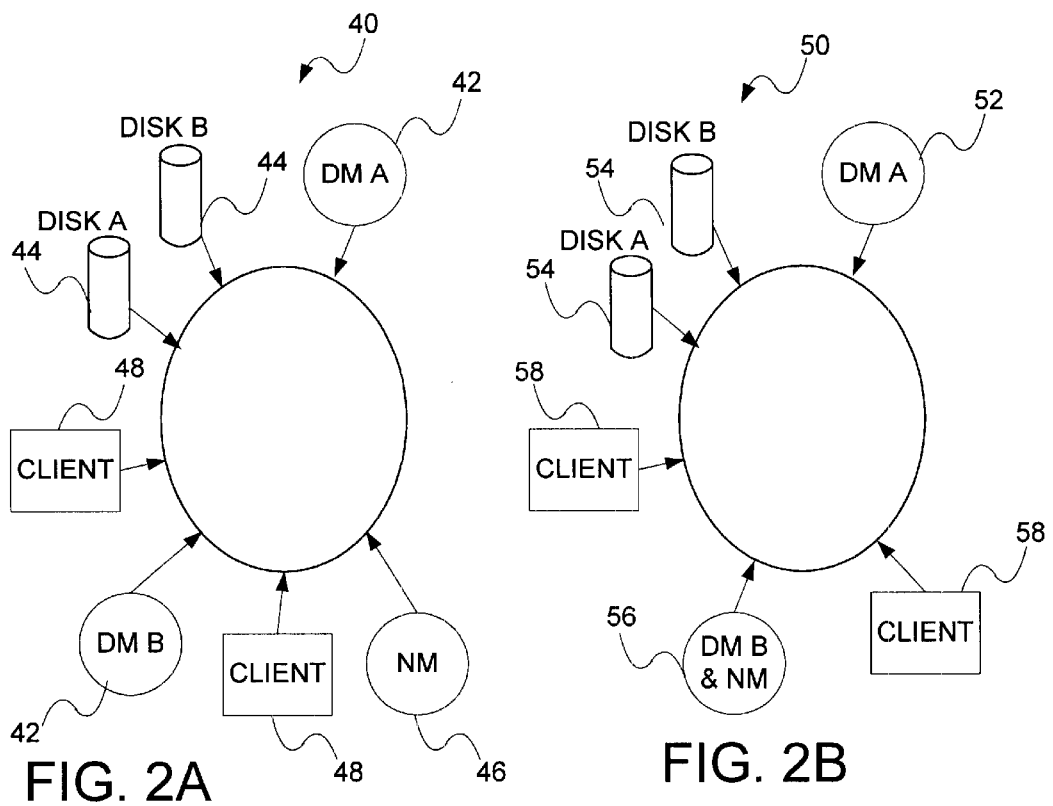
FIG. 2A
FIG. 2B
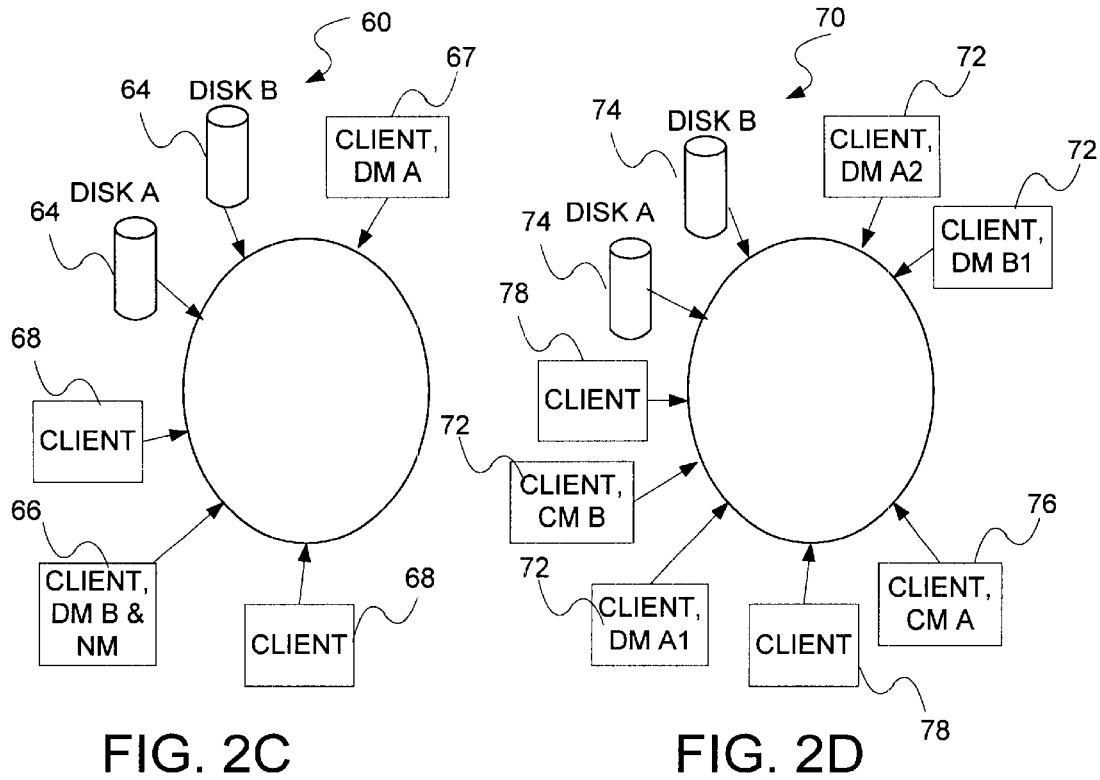
FIG. 2C
FIG. 2D

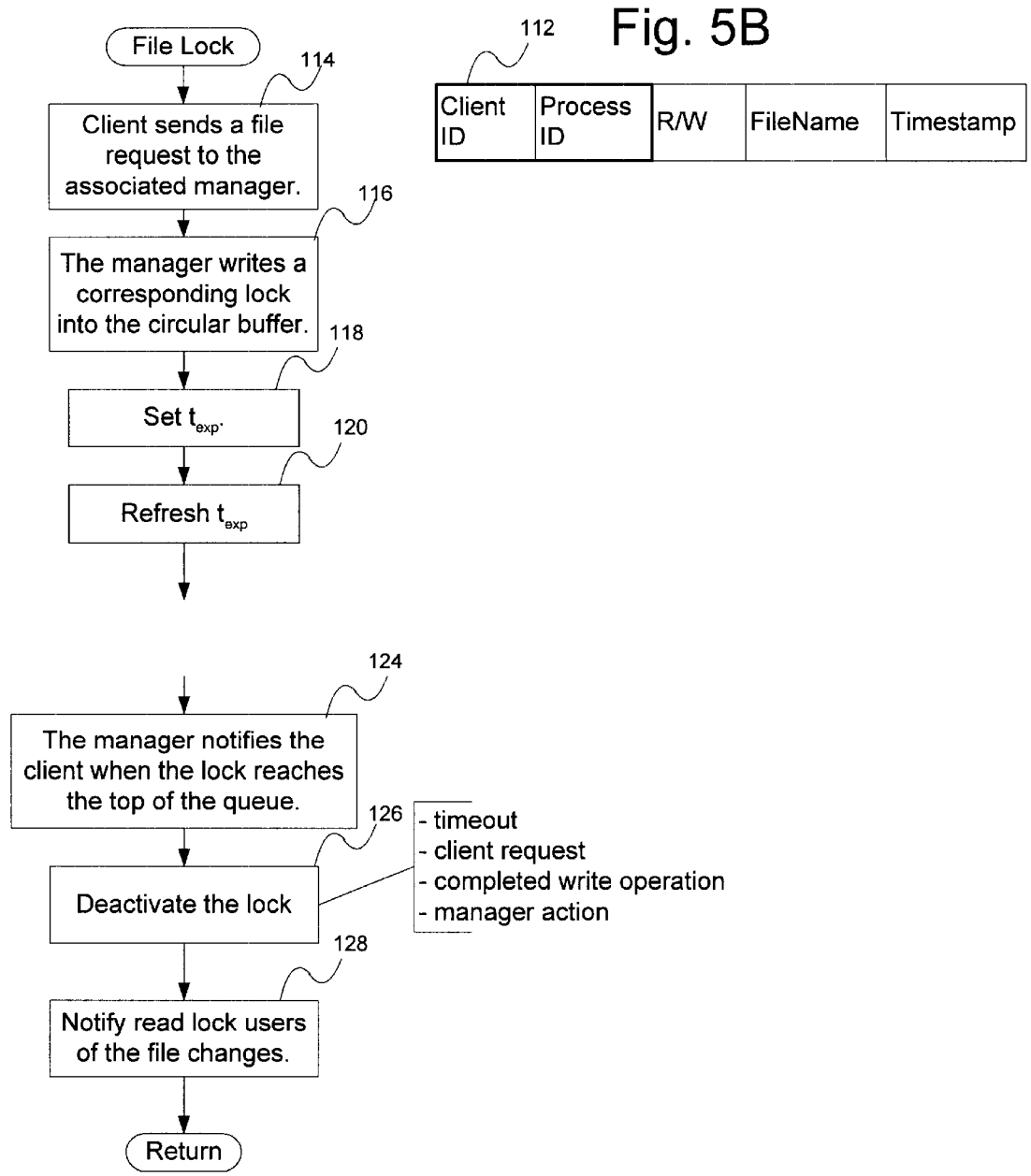

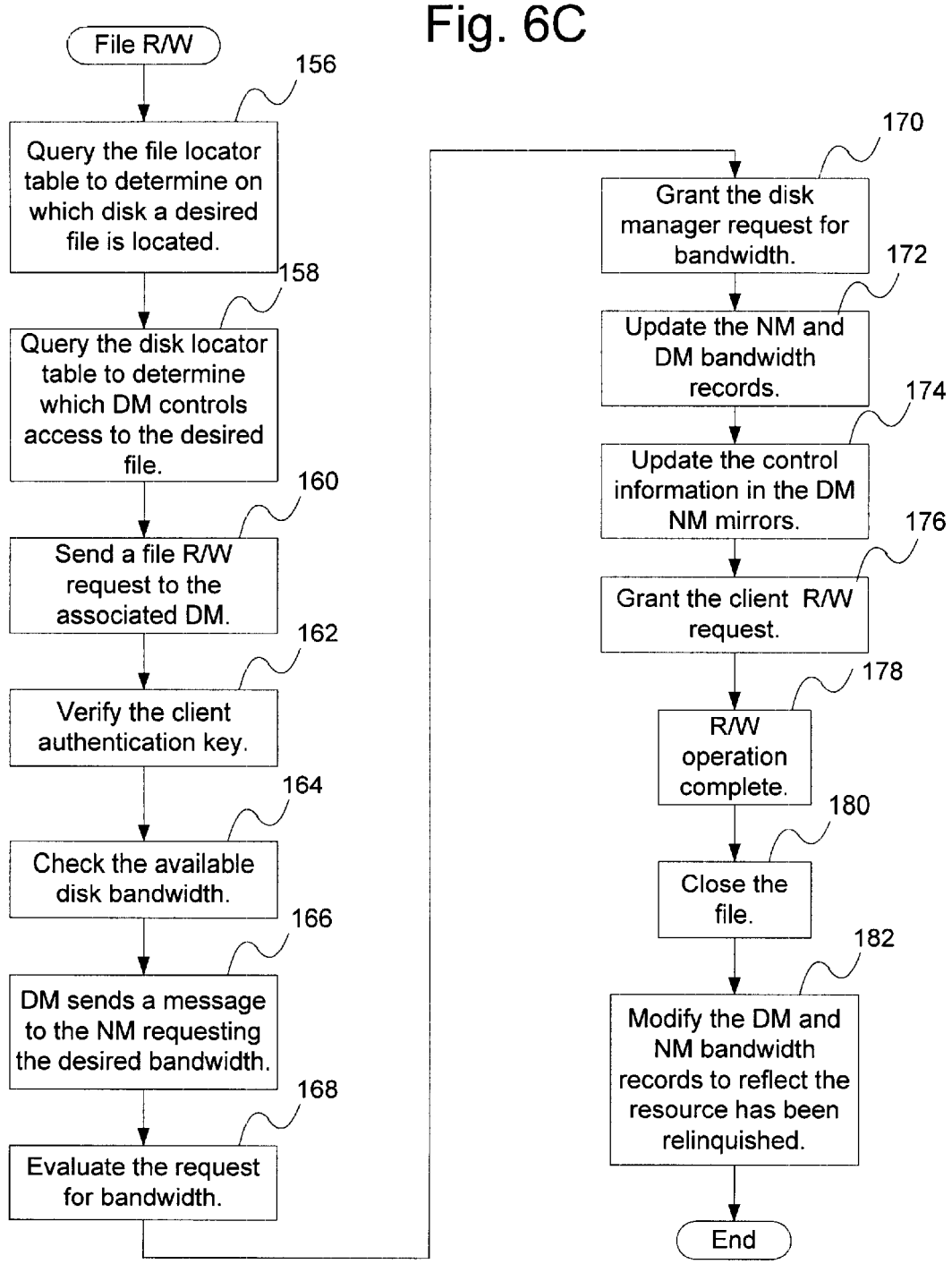

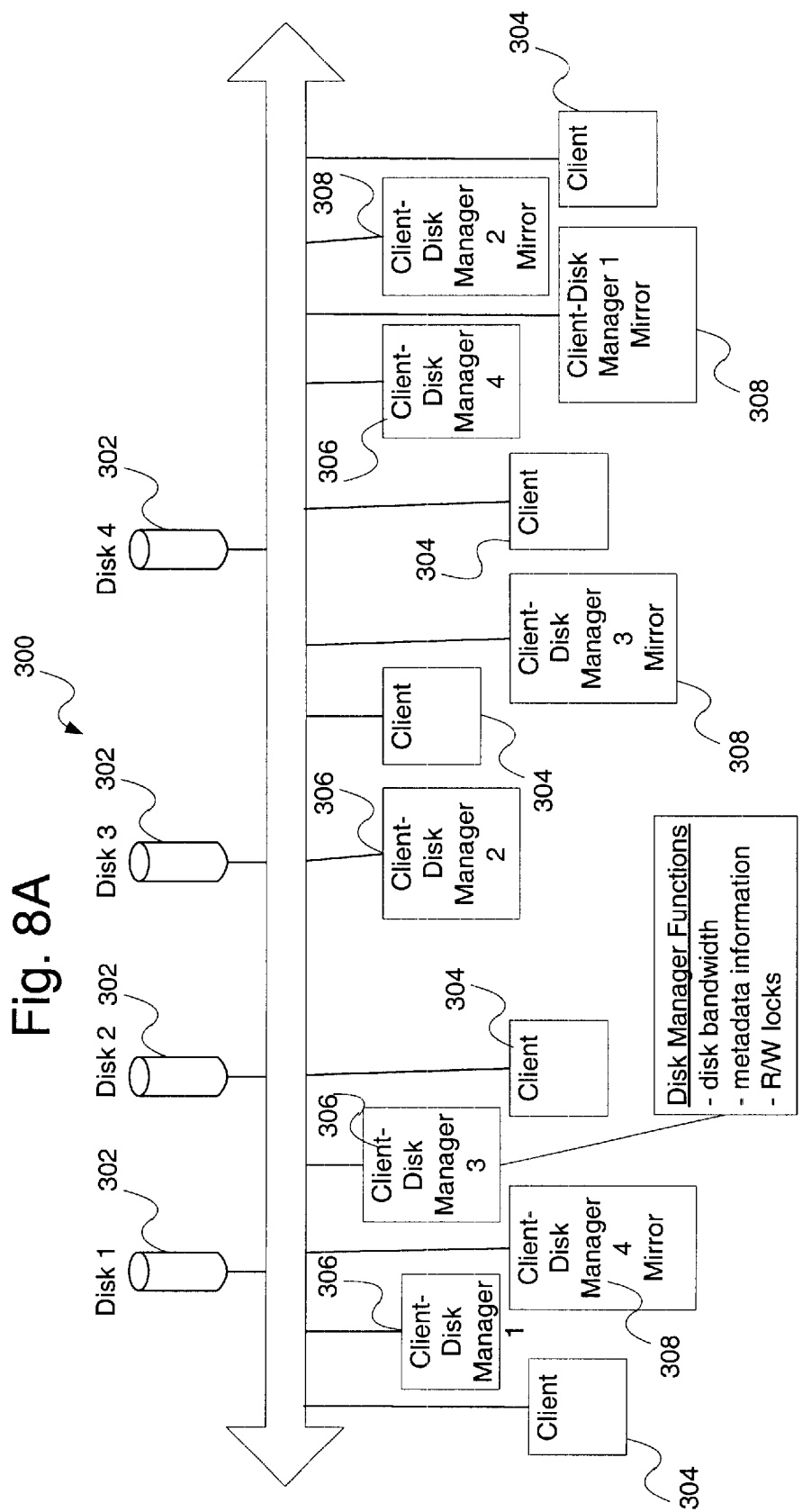

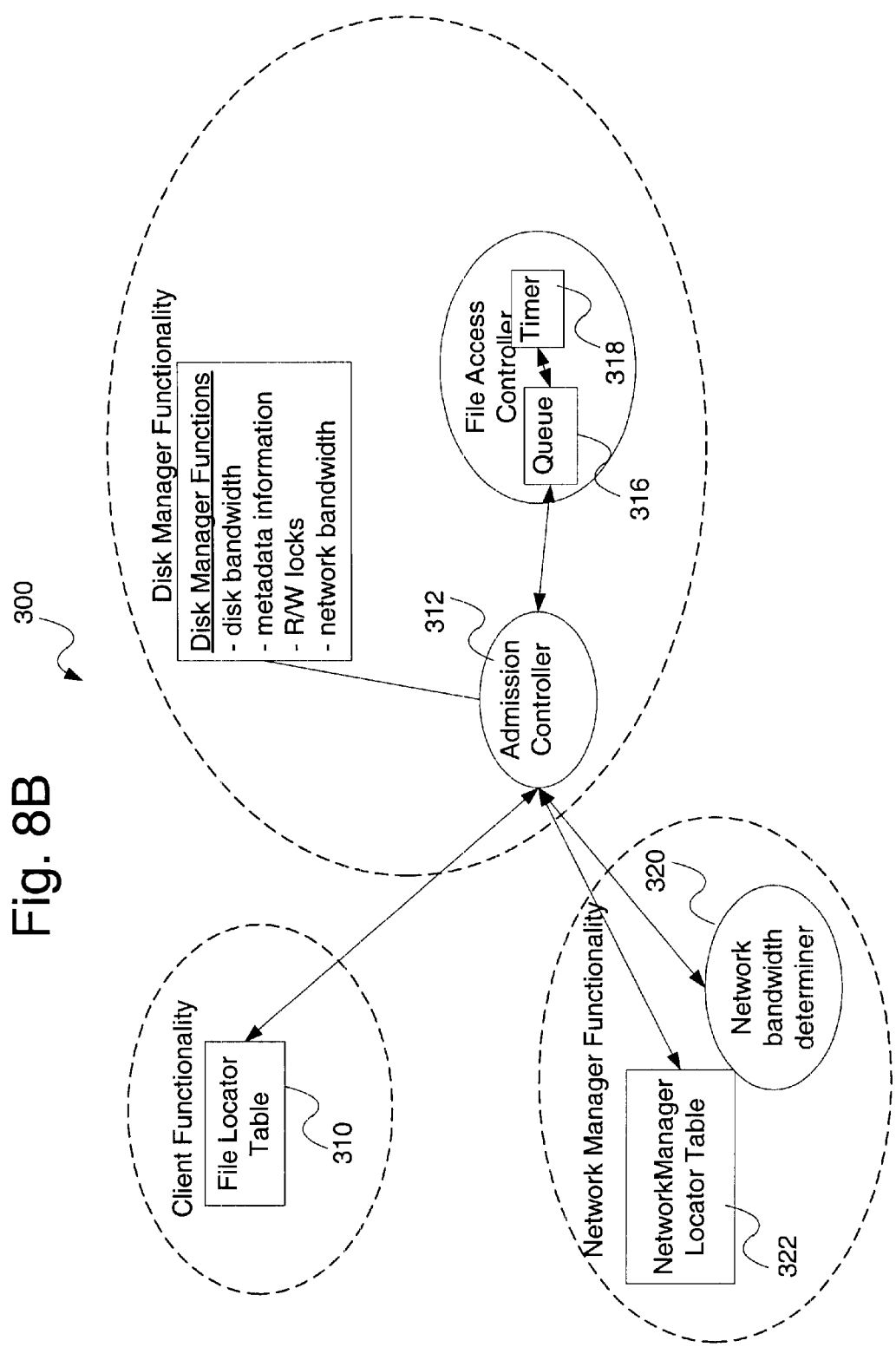

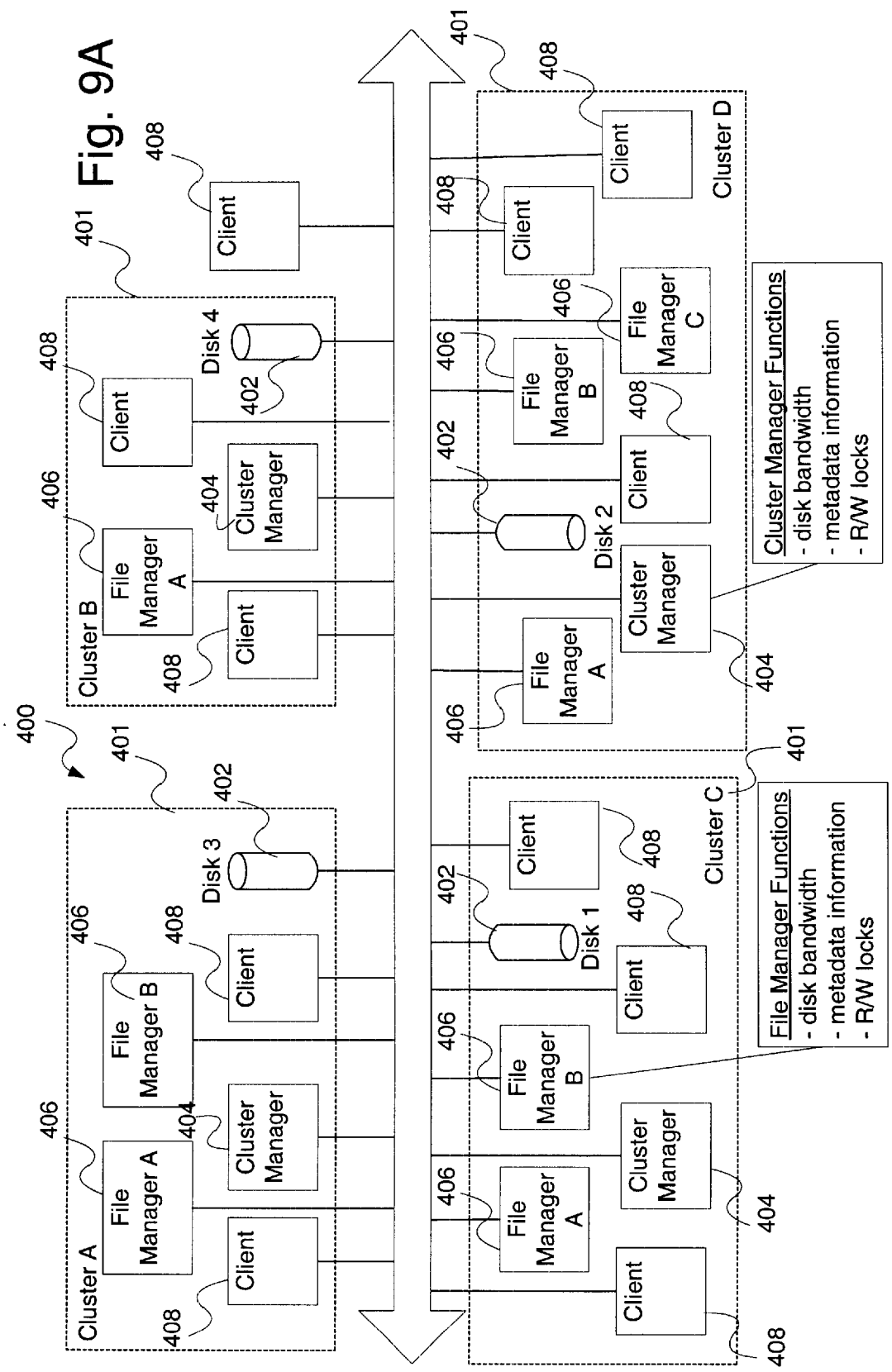

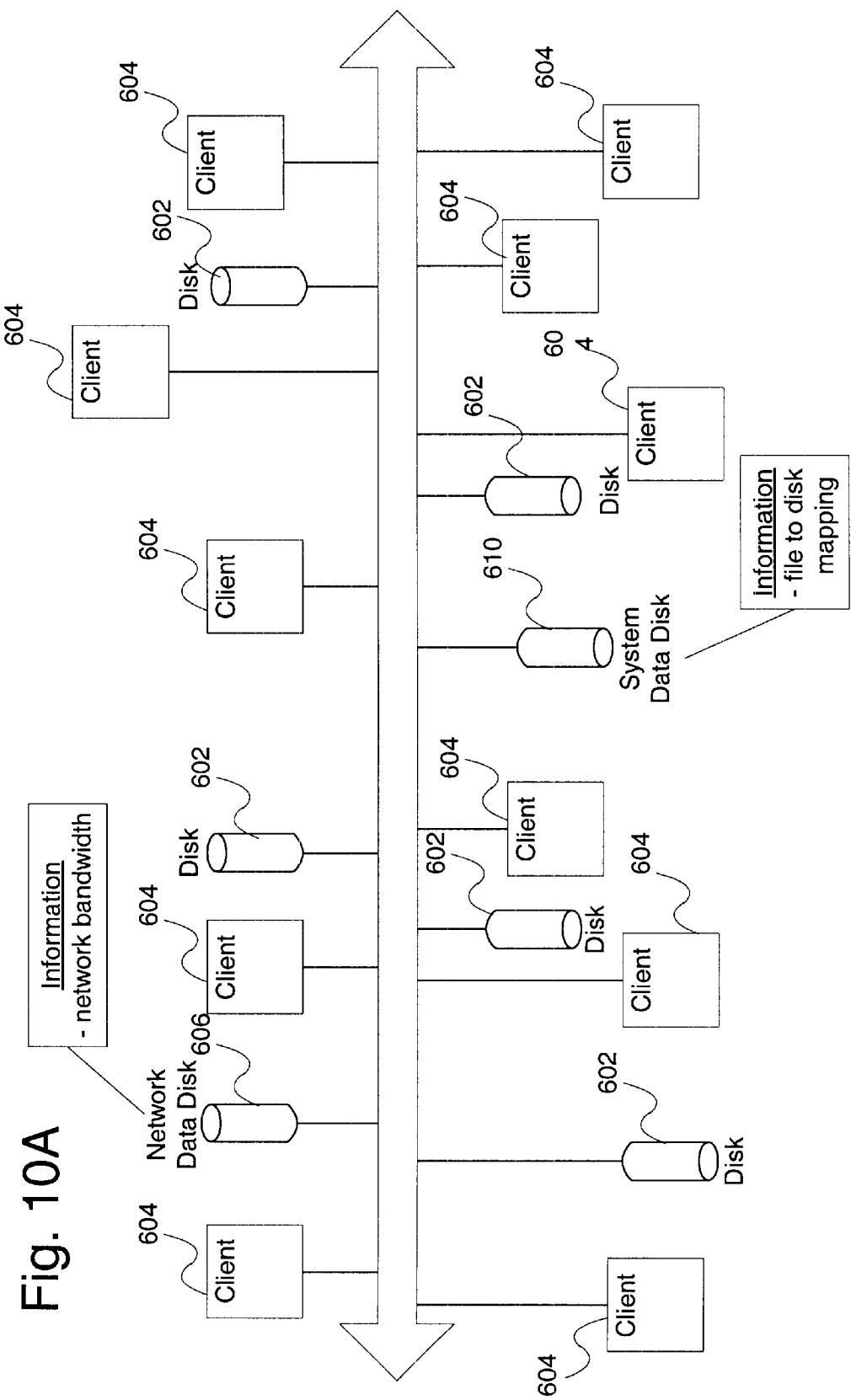

MULTIMEDIA FILE SYSTEMS USING FILE MANAGERS LOCATED ON CLIENTS FOR MANAGING NETWORK ATTACHED STORAGE DEVICES

BACKGROUND AND SUMMARY OF THE INVENTION

The present invention relates generally to file systems for the storage of multimedia data. More particularly, the invention relates to an inexpensive, scalable, open-architecture file system that can be used to store and retrieve data with either real-time or high volume requirements.

With the recent advances in networking and storage technologies and expanding multimedia applications, there is an increasing interest in providing improved storage and retrieval of multimedia data. Distant education and training, multimedia entertainment, news editing and distribution, video-on-demand services in hotels and enterprises, multimedia communications, and commercials are some of the applications that are expected to benefit from an improved storage and retrieval process. Multimedia data types include audio and video in a variety of formats as well as text and images.

Increased constraints are placed on the storage and retrieval of multimedia data over traditional textual and numeric data due to inherent differences in the characteristics of the data types. Unlike textual data, multimedia audio and video data, known as continuous media, is sensible only when played back in temporal contiguity. Additionally, continuous media data usually requires a large quantity of storage space and places severe bandwidth demands upon servers. Generally, conventional systems employ a centralized server approach that typically does not scale well to meet increasing bandwidth demands caused by increases in system size.

Therefore it is desirable to provide a file system for multimedia applications wherein clients are interconnected by a highspeed network to network-attached storage systems. It is Therefore it is desirable to provide a file system for multimedia applications wherein clients are interconnected by a highspeed network to network-attached storage systems. It is additionally desirable for the file system to be adaptable for use with a serverless system or distributed servers wherein the system management load is shared across all the servers. Also, it is desirable for the file system to be scalable in terms of performance as well as implementation simplicity. In addition, it is desirable for the file system to support real-time data operations as well as non-real time data objects. Additionally, it is desirable for the system to provide file security and to gracefully degrade when faults occur.

The present invention provides a multi-media file system for communicating information between a multi-media client and a network storage device over a network. The file system includes a cluster that comprises one cluster manager and at least one file manager with each network storage device. The cluster manager is located on a client, includes an admission controller for controlling the admission of a request from a client for a file operation upon a selected file. A network bandwidth request from the admission controller is responded to by a network status determiner included in the cluster manager. The network status determiner determines the available network bandwidth. Each file manager is located on one of the clients. The file managers manage file maintenance procedures of corresponding files located on the network storage device. Each file manager includes a disk status determiner for determining the available disk bandwidth. The disk status determiner responds to a request from the admission controller.

For a more complete understanding of the invention, its objects and advantages, reference may be had to the following specification and to the accompanying drawings.

BRIEF DESCRIPTION OF THE DRAWINGS

FIG. 1A is a network datagram illustrating a prior art multimedia file system;

FIG. 1B is a network datagram illustrating a presently preferred embodiment of the invention;

FIG. 2A is a network datagram presenting a general illustration of a presently preferred embodiment of a dedicated distributed server file system configured in accordance with the principles of the invention;

FIG. 2B is a network datagram presenting a general illustration of a presently preferred embodiment of a cooperative distributed server file system configured in accordance with the principles of the invention;

FIG. 2C is a network datagram presenting a general illustration of a presently preferred embodiment of a dynamic disk manager file system configured in accordance with the principles of the invention;

FIG. 2D is a network datagram presenting a general illustration of a presently preferred embodiment of a hybrid file system configured in accordance with the principles of the invention;

FIG. 5A is a sequence diagram illustrating a procedure for locking and unlocking files and tables;

FIG. 5B is a datagram illustrating a lock configuration;

FIG. 6C is a sequence diagram illustrating a procedure for admission control of a file operation in a presently preferred embodiment of a dedicated distributed server file system configured in accordance with the principles of the invention;

FIG. 8A is a block diagram of a presently preferred embodiment of a dynamic disk manager file system configured in accordance with the principles of the invention;

FIG. 8B is a detailed block diagram of a presently preferred embodiment of a dynamic disk manager file system configured in accordance with the principles of the invention;

FIG. 9A is a block diagram of a presently preferred embodiment of a hybrid file system configured in accordance with the principles of the invention;

FIG. 10A is a block diagram of a presently preferred embodiment of a passive disk serverless file system configured in accordance with the principles of the invention;

DETAILED DESCRIPTION OF THE PREFERRED EMBODIMENTS

Figure 3A:
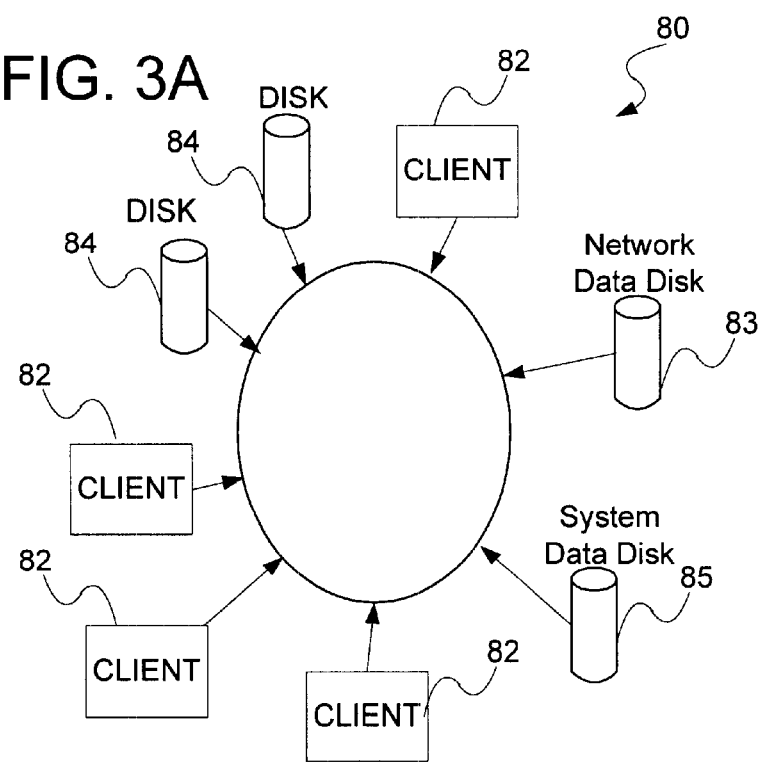
FIG. 3A is a network datagram presenting a general illustration of a presently preferred embodiment of a passive disk serverless file system configured in accordance with the principles of the invention.

Referring to FIG. 1A, a conventional file system 10 for server attached storage devices 12 is illustrated serving a plurality of clients 14 through a network 16. A centralized server 18 controls access by the clients 14 to the storage devices 12 which are located on an inner control network 20.

The centralized server 18 is a single dedicated node that controls the admission process as well as all other file access, read/write operations, and security issues. All of the read/write operations are approved and handled by the centralized server. Thus, the implementation of the file system 10 is simple and the network bandwidth required for maintaining data integrity is low. Also, because of the centralized control, file security can be easily enforced. However, the centralized server approach is limited by scalability problems and fault tolerance issues. Scalability becomes a problem as the number of clients increases, causes an increasing demand upon the server bandwidth to service the increasing number of file operation requests. The centralized server is also a potential site for a single point failure that will cause a system interruption. The failure of the server will have an adverse effect on all of the clients simultaneously. Although a mirror of the server can be maintained, there is no graceful degradation when the server fails. Instead, there is a temporary cessation of server performance before the mirror of the server becomes functional.

Referring to FIG. 1B, an embodiment of a distributed server file system 30 configured in accordance with the principles of the invention is illustrated. In the file system 30 a set of designated network nodes share the load and functions of the server. Thus the load is distributed over the servers enabling scalability of the system. Scalability is achieved by employing additional servers as the number of clients increases. With the distributed server file system 30 there is no single point of failure. When a failure does occur, the system gracefully degrades as the failed server load is seamlessly shifted to the other servers. In any case, the failure of a server affects only a subset of the clients. With the increased number of nodes acting as servers, the level of security is lower than that of a centralized server. Additionally, resource sharing as well as maintenance of consistent information across all the servers requires the implementation of control algorithms.

The various devices of the file system 30 are interconnected by a network 32 that provides a communication framework. In the present embodiment a Fibre channel network is employed for the network 32, however it is within the scope of the invention to employ other networks, such as Ethernet or SCSI. Storage devices 34 connect to the network for storing and supplying multimedia files such as audio data files, video data files and video data objects. Examples of storage devices that are within the scope of the invention include logical disks such as a single disk or a set of disks through which a file is stripped. A plurality of clients 36 connect to the network 30 in order to gain access to the storage devices 34 and the various multimedia files on the storage devices. One or more servers 38 connect to the network 32 for controlling the admission process of clients 36, as well as all other file access, file read/write operations, and file security issues. Although, a dedicated server 38 is depicted in FIG. 1B, the scope of the invention includes distributing the functions of the server 38 to other network devices such as the clients 36 and storage devices 34.

Two major performance advantages result from having distributed file systems that employ storage devices 34 that attach to the network. First, simple, data intensive operations are off-loaded from the servers 38 and thus a greater quantity of clients 36 can be supported by the servers 38. Second, by coupling file access computation and network transfer bandwidth to each storage device 34, aggregate transfer bandwidth scales with storage devices 34 (rather than the server memory and network bandwidth). In addition, it is not necessary to store-and-forward copy data through the server 38.

Server Functions

There are several tasks that the server 38 is potentially responsible for managing in a multimedia service environment. The tasks include disk bandwidth management, network bandwidth management, file lock management, security issues, free list management, fault tolerance, metadata management, and scheduling. The disk bandwidth management is a light load operation that includes checking the available storage device bandwidth and the requested bandwidth to complete the admission control. The network bandwidth management task is also a light load operation wherein the server 38 checks the network bandwidth availability while doing the admission control. File lock management includes maintaining file read/write locks in order to maintain data integrity and recovering a file lock from a non-responsive client. A write lock ensures that only one client is permitted to modify a file at a time. A read lock is used to notify the clients 36 about changes in data after the data has been cached by the clients 36 for reading. Read locks present a heavy load to the server 38. The security task for the system 30 is a heavy load on the server 38 that includes restricting access to selected files to certain clients. The servers' free list management task includes maintaining a free list of blocks that are available for allocation writing operations onto the storage devices 34. After a write request admission, the server 38 provides the addresses of free blocks to the client 36 that requested permission to write. Free list management is a heavy load. Fault tolerance tasks include mirroring of storage devices and control files as well as other fault recovery techniques. The preferred response to a fault includes graceful degradation of system performance, however the temporary shutdown of system performance until a backup unit comes on line is also a valid performance option. Both fault tolerance techniques impose a heavy load upon the server. Metadata management is a medium load server task that is required in a serverless file system approach if the clients cache metadata information. When write operations by other clients cause the metadata to be modified, the client that is acting as server either logically remaps the cached metadata or informs the other clients to reload the new metadata. Two types of scheduling issues involve storage servers, disk scheduling and network bandwidth scheduling. The disk scheduling algorithms minimize the disk head movement while meeting the real-time constraints of the requests. The network scheduler allocates the network bandwidth by time multiplexing contending requests.

File Systems with Distributed Server Configurations

With reference to FIGS. 2A to 2D, several embodiments of distributed server configurations that are within the scope of the invention are illustrated. Each of the distributed server configurations has strengths and weaknesses that dictate the environment in which the particular server configuration is most appropriate. The server configurations range from dedicated distributed servers, to cooperative distributed servers, through dynamic disk managers, and finally to a hybrid configuration. To provide an overview of a portion of the envisioned file system a brief summary of the characteristics of each distributed server configuration type follows. A more detailed description of each configuration type will be provided in later sections of this specification.

Referring to FIG. 2A, in the dedicated distributed server file system 40 a dedicated disk manager (DM) 42 is statically assigned to each logical disk 44 to carry out admission control and other server related tasks for that disk 44. Each disk manager 42 in the file system is aware of the identity of the other disk managers 42. The network bandwidth management and scheduling tasks for the file system 40 are handled by a network manager 46 that is statically located on a centralized node. In addition, each client 48 maintains a disk locator table that maps each disk 44 to the corresponding disk manager 42.

Referring to FIG. 2B, in the cooperative distributed server file system 50 the disk managers 52 are again statically assigned to the disks 54. To avoid the centralization bottleneck that occurs with assigning a dedicated network manager; the network manager functions and tasks are cooperatively handled by a disk manager 52 that is made the current network manager 56. To exchange network bandwidth information the disk managers 52 employ a number of possible operations that are explained later in this specification. Again, each client 58 maintains a disk locator table that maps each disk 54 to the corresponding disk manager 52.

With reference to FIG. 2C, in the dynamic disk manager file system 60 the clients 68 are employed to share the network and file management tasks that are generally assigned to a server. In the file system 60, clients are assigned as dynamic disk managers 62 for each disk 64, therefore dedicated servers are not required. Since the clients 68 are trusted to handle the tasks normally assigned to a server, the network environment is less secure than a file system with statically assigned file managers. The dynamic disk managers 62 also cooperatively handle the network manager functions and tasks by assigning a dynamic network manager 66.

Referring to FIG. 2D, a hybrid file system 70 is illustrated. The hybrid file system 70 is especially applicable in a scalable system where there might be a substantial increase in the number of nodes with a commensurate increase in file requests. In the hybrid file system 70 the file management tasks for each disk 74 are split and shared between a statically assigned cluster manager (CM) 76 and a set of dynamically assigned file managers 72. Providing multiple file managers 72 for each disk 74 reduces the load on individual file managers and permits scalability of the file system 70. Since the clients 78 are trusted to handle the tasks normally assigned to a server, the network environment is less secure than a file system with statically assigned file managers. In addition to managing the clusters, the cluster managers 76 also cooperatively handle the network manager functions and tasks.

Figure 3B:
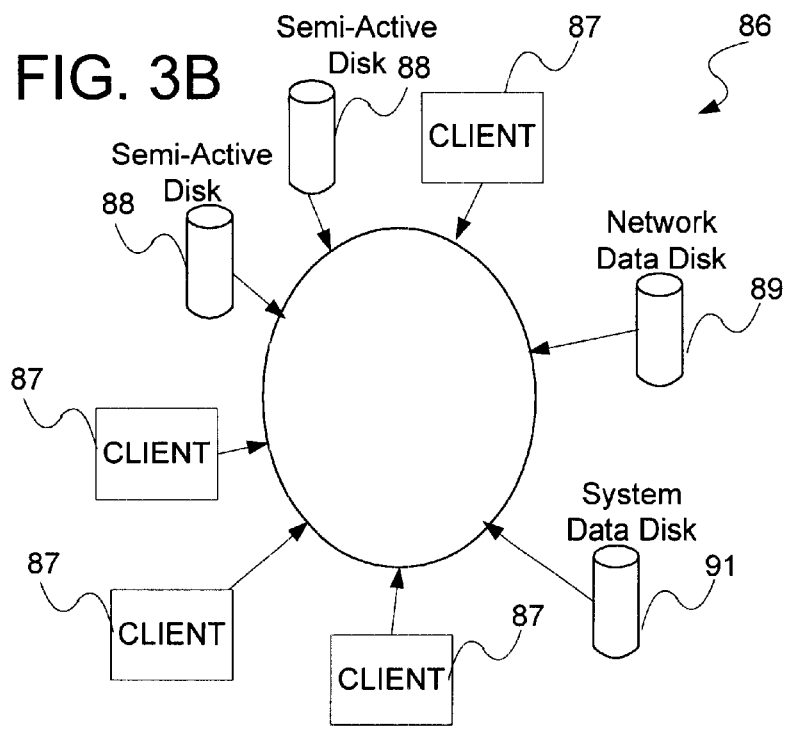
FIG. 3B is a network datagram presenting a general illustration of a presently preferred embodiment of a semi-active disk serverless file system configured in accordance with the principles of the invention.

Referring to FIGS. 3A and 3B, a serverless file system is an alternative to distributed file systems in an environment where security is not a major concern, such as when all of the clients are trusted. In a serverless system the storage devices as well as the clients are connected directly to the network. Any device can be accessed by any of the clients directly. Based on the system status, either a client or the disk provides admission control and resource allocation, and maintains the data integrity issues associated with the file. Thus the functionality of a server is distributed in a self-service fashion. Serverless file systems are highly scalable and have virtually no performance bottlenecks. Server fault-tolerance issues are non-existent in serverless systems since the failure of a client does not affect any other client.

With specific reference to FIG. 3A, a passive disk serverless file system 80 is illustrated. In the passive disk serverless system 80, all of the information necessary for admission control and data consistency management is stored on the disks 84. A portion of the disk cache and a small amount of bandwidth are reserved for storing and retrieving control information for the file system 80. A client 82 that requests a file operation, provides its own admission control and resource allocation, and maintains the data integrity issues associated with the file operation. A disk status file that is stored in the disk cache of every disk 84 contains bandwidth information for admission control as well as information for maintaining data integrity. A network data disk 83 provides network bandwidth information for the file system 80. A system data disk 85 provides system metadata such as file name to disk address mapping.

Referring to FIG. 3B, a semi-active disk serverless file system 86 is illustrated. The semi-active disk serverless file system 86 is similar to the passive disk serverless file system 80 with the exception that admission control is performed on a semiactive disk 88 instead of on a client 87. As in the passive disk serverless file system, a network data disk 89 and a system data disk 91 provide network bandwidth information and system metadata respectively.

File System Operating Techniques and Modes

The following sections describe operating techniques and modes that relate to several of the file system configurations that are within the scope of the invention.

Admission Control

Admission control is the process a client must complete before operating on a file. Before the client reads or writes to a file there must be sufficient file and network bandwidth for the requested operation. In addition, the file must be accessible to the client. For example, the client will not be granted access to a file that is in the process of being written to by another client, or access to the file might be limited to a predetermined group of clients. Once the client is granted access to a file, the file management and network management records are updated to reflect the changed system status.

Bandwidth Determination Techniques

A number of bandwidth determination techniques are employed to determine the file and network bandwidth consumption. In file systems with a statically assigned manager, the manager maintains the bandwidth status and all bandwidth requests are directed to the manager. For file systems with dynamically assigned managers, a number of techniques are employed for bandwidth determination. One bandwidth determination technique requires the use of a bandwidth status file that is maintained at a location known to the network entity or entities that conduct the admission control process. Each time a client is granted access to a file, the appropriate bandwidth status files are updated by the manager. Another bandwidth determination technique employs a token that contains either the network status or file status information. To obtain the token, one manager multicasts to the other managers. After receiving the token, the manager determines whether sufficient bandwidth is available and modifies the status information if the admission request is granted. An alternate technique that also employs a token permits a manager that acquires the token to multicast a message to obtain the bandwidth consumption of each of the other managers. A unique form of bandwidth determination and allocation is referred to as the split and share technique which is described in detail in the following section.

Split and Share Technique

Figure 4:
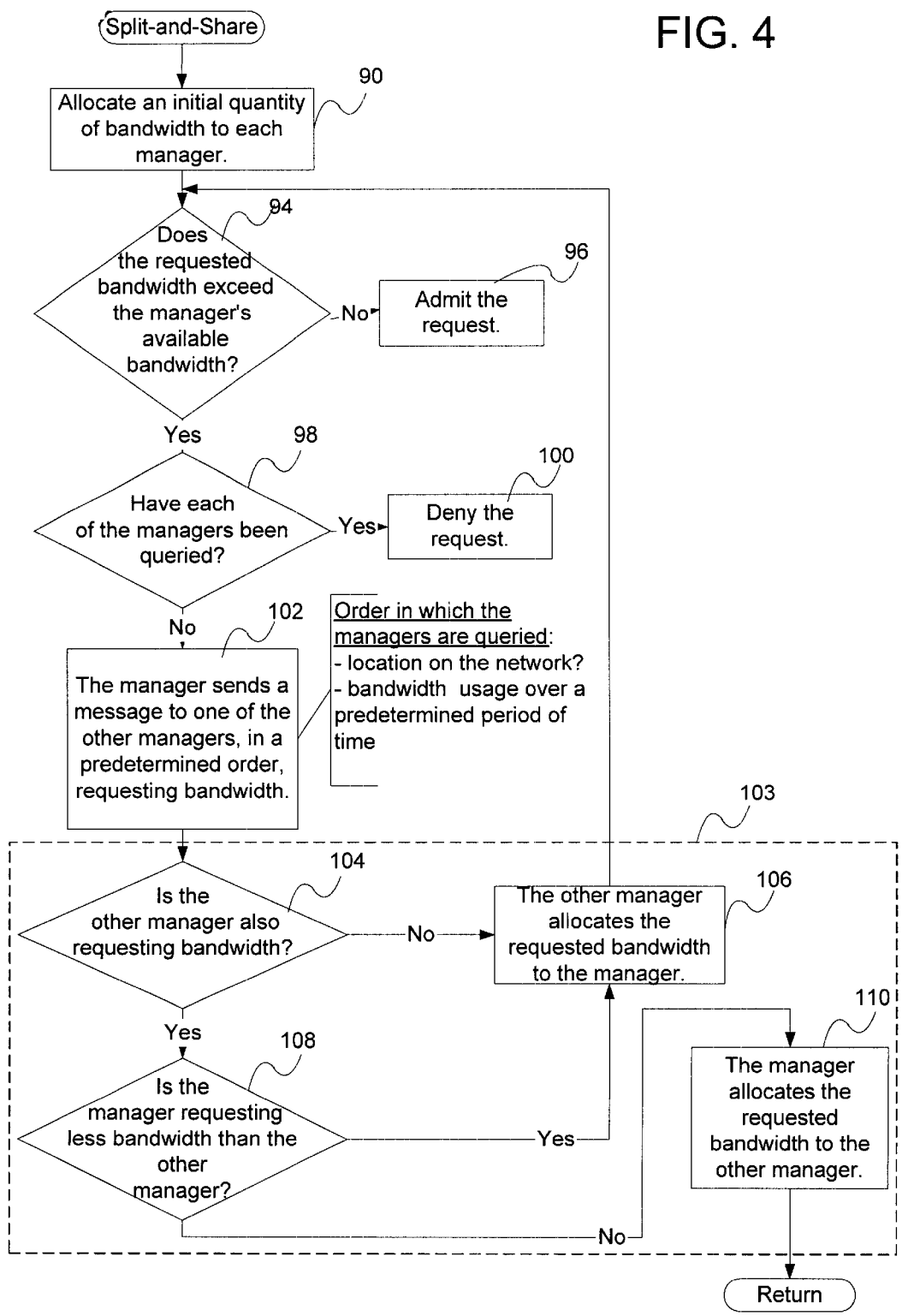
FIG. 4 is a sequence diagram illustrating a procedure for managing bandwidth.

Referring to FIG. 4, the split and share technique is illustrated. The split and share technique is used to initially split and distribute the available bandwidth amongst the managers and then to provide a process for the dynamic reallocation of bandwidth during steady-state operation. At step 90 an initial quantity of bandwidth is allocated to each manager. The initial bandwidth allocations are based on criteria such as prior experience, the expected workload, and the type of data the manager controls. The bandwidth allocations are then dynamically adjusted during the operational period, as managers that require additional bandwidth, poll the other managers for excess bandwidth. This is illustrated in the following steps. At step 92 a request for the usage of bandwidth is received by the manager. The manager evaluates the request, step 94, and grants the requested bandwidth if it meets a predetermined request benchmark, such as being less than the bandwidth allocated to the manager, step 96. The manager then completes its admission control. At step 98, the manager determines whether all of the other managers have been queried for excess bandwidth. The request is denied if all of the other managers have been queried, step 100. Otherwise, the manager continues to poll the other managers for excess bandwidth, step 102. Although in the preferred embodiment of the invention the other managers are polled in a predetermined order, such as location on the network and previous bandwidth utilization, it is within the scope of the invention to poll the other managers randomly. The other manager allocates the requested bandwidth if that manager is not also requesting excess bandwidth, steps 104 and 106. When more than one manager is requesting bandwidth a priority is assigned to the managers based on a predetermined manager bandwidth priority, such as the quantity of bandwidth that the managers are each requesting and the importance of the requesting managers, step 103. In the preferred embodiment of the invention, the bandwidth priority is determined based on the quantity of bandwidth that each manager is requesting. If the manager is requesting less bandwidth than the other manager is requesting, then the other manager allocates the requested bandwidth to the manager, steps 108 and 106. If the manager is requesting more bandwidth that the other manager is requesting, then the manager allocates the requested bandwidth to the other manager, steps 108 and 110. Once the manager has queried each of the other managers it conducts its admission control based upon the amount of bandwidth it was able to acquire.

Generally, the bandwidth allocation associated with each manager eventually stabilizes at a steady state quantity. Under heavy bandwidth usage, employing the split and share technique minimizes the bandwidth consumption that is normally required for determining and allocating the available bandwidth. While during light bandwidth usage, the bandwidth usage overhead is reduced to a level in line with system bandwidth consumption. The split and share technique can be applied with statically assigned managers as well as dynamically assigned managers.

File Access and Locking

A locking/unlocking mechanism is used to provide exclusive access to a file for a client that wants to write onto it. The optional usage of the locking/unlocking mechanism for a read operation is also provided. Maintenance of the read/write locks is provided by the disk managers. With reference to FIG. 5B, the structure of a lock that conforms with the principles of the invention is illustrated. The lock includes a user signature 112, a filename 114, and a timestamp 116. In the presently preferred embodiment of the invention the user signature 112 includes the client id appended with a unique process number. To avoid starvation and ensure fairness among the clients, the lock-file includes a circular buffer in order to queue write requests. Referring to FIG. 5A, the file lock process is illustrated. To write to a file a client sends a request to the disk manager associated with the file, step 114. The disk manager writes a lock corresponding to the request into the circular buffer as the next entry, step 116. The lock expires after a predetermined time period, $t_{exp}$, which is determined through prior statistical analysis or is selected by the user when the request is made 118. The lock is freed after $t_{exp}$ unless it is refreshed 120. Thus, if the client needs to do a long editing operation, the file has to be refreshed periodically. Mechanisms for refreshing the lock include having either the client or the associated disk manager request that the lock be refreshed. The disk manager notifies the client when the lock corresponding to the client's request advances to the head of the queue 124. The client's corresponding file request is then processed. The lock remains active until a deactivation event occurs, such as a client requests deactivation, $t_{exp}$ times out, the manager requests deactivation, and deactivation is set to occur when the file operation is completed 126. When a read lock is used, all of the users with read locks are notified of any changes made to files corresponding to the users corresponding lock 128. Notification of file changes helps to ensure data consistency throughout the system.

Fault Tolerance

To provide for recovery from the failure of a server or client, mirrors of the managers associated with each of the configurations are maintained on other network nodes. In the preferred embodiment of the invention, mirrors for the managers are maintained on network nodes upon which other managers do not reside. However, it is within the scope of the invention to include mirrors on network nodes upon which other managers do reside. The managers for which mirrors are maintained include network managers, file managers, and cluster managers. In operation, when control information such as a request or a lock refresh is received, the manager first updates the corresponding information in the mirrored copy and then performs the control operation.

The mirror of a manager remains inactive until a manager failure occurs. An example of a manager failure is when a client sends a request to a manager and doesn't receive a response within a predetermined inactivity time period. When a manager failure occurs, the requesting client activates the mirrored version. The mirrored version then becomes the new manager and creates a mirror on a network node. The new manager then broadcasts a message to the other managers and the clients associated with its management functions, notifying them of the change in status and the identity of its mirror. After the notification is sent, all of the inactivity timers that corresponded with the failed manager are restarted and associated with the new manager.

Distributed Server File System Configurations

In a distributed server file system environment a set of designated network nodes share the load and functions of the server. Thus the load is distributed over the servers enabling scalability of the system. As the quantity of clients increases, the quantity of servers is increased to handle the increased load. When a server fails, the system gracefully degrades as the load of the faulty server is shifted to the other servers. In any case, the failure of a server affects only a subset of the clients, instead of all the clients as happens in a centralized server configuration. In the distributed server file system the level of security is lower compared to that of a centralized server due to the greater number of network nodes, servers, which are trusted. In addition to decreased security, the generation of algorithms for resource sharing and maintenance of consistent information across all the servers are required.

Dedicated Distributed Server File System

Figure 6A:
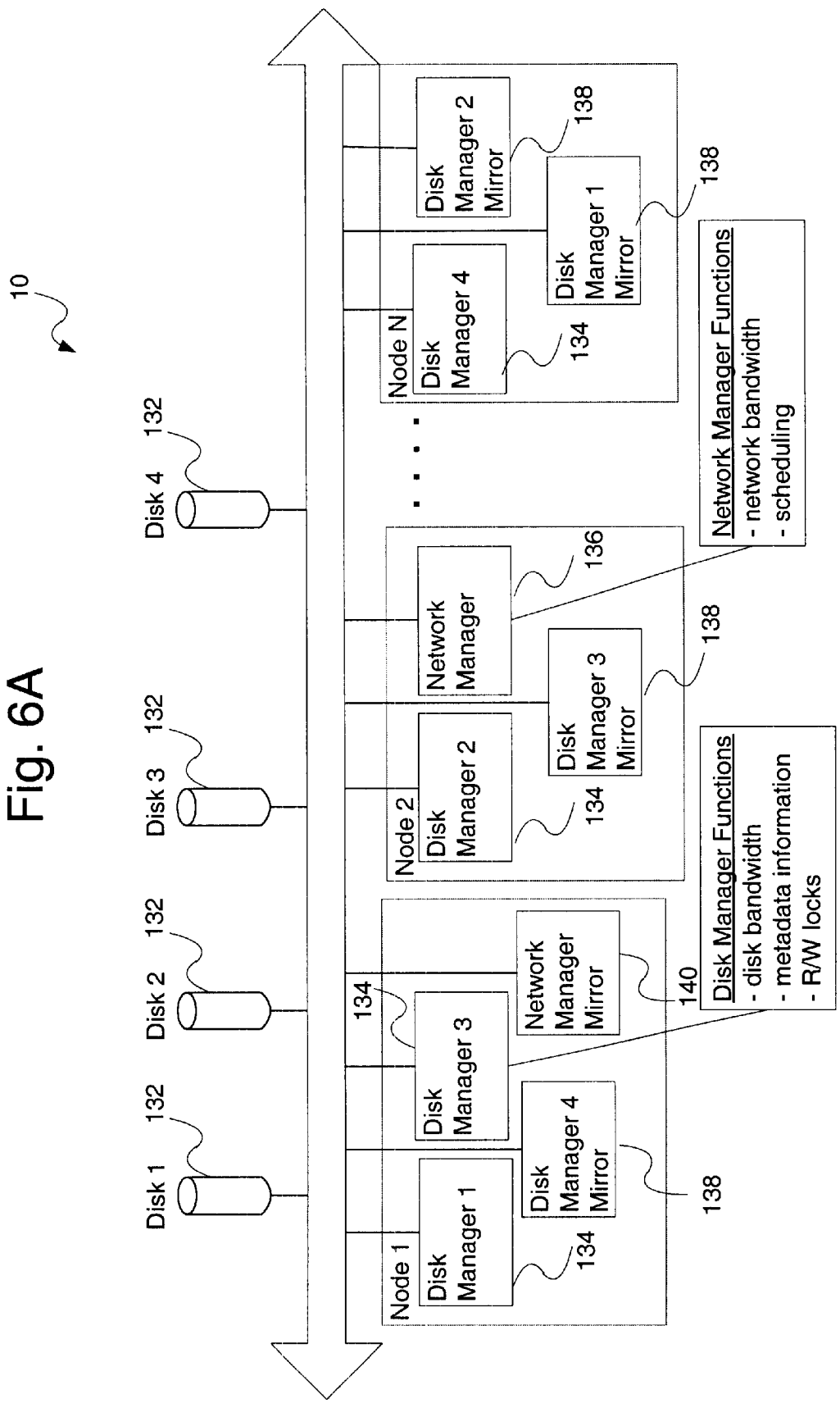
FIG. 6A is a block diagram of a presently preferred embodiment of a dedicated distributed server file system configured in accordance with the principles of the invention.

Referring to FIG. 6A, a dedicated distributed server file system 130 for providing file services to a plurality of clients 131 is illustrated. In the dedicated distributed server file system 130, each disk 132 is assigned a dedicated disk manager 134 that provides the admission control and other server-related tasks for that disk 132. The disk manager 134 is essentially a network node that maintains the available bandwidth of the associated disk 132, the metadata information, and maintains the read/write locks for the files that reside on the associated disk 132. A network manager 136, which is a centralized node, provides the network bandwidth management and scheduling issues. The network manager 136 also maintains the available network bandwidth information. Disk manager mirrors 138 for each of the disk managers 134, and a network manager mirror 140 provide fault tolerance for the file system 130.

Figure 6B:
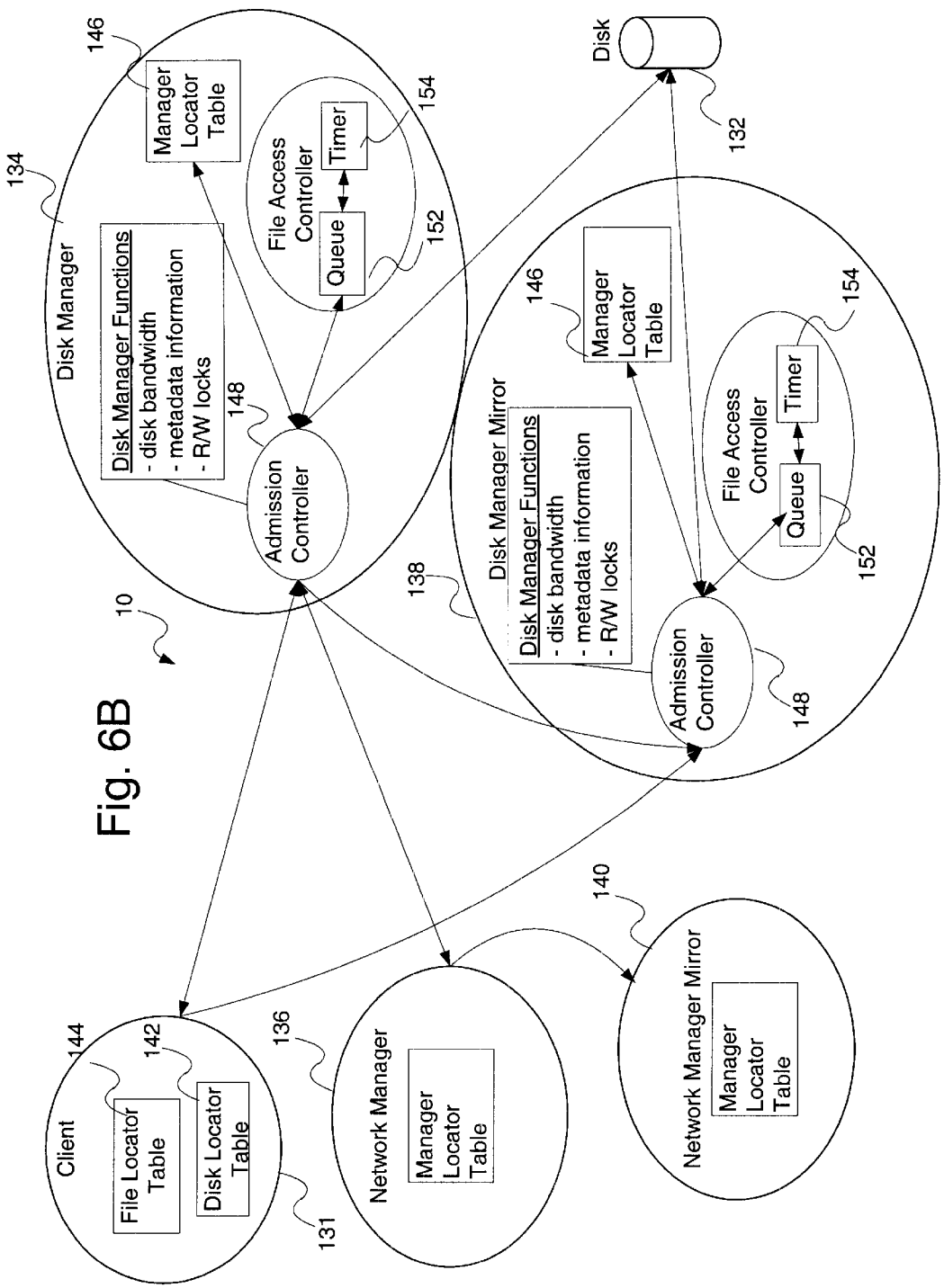
FIG. 6B is a detailed block diagram of a presently preferred embodiment of a dedicated distributed server file system configured in accordance with the principles of the invention.

With additional reference to FIG. 6B, a more detailed illustration of the dedicated distributed server file system 130 is provided. Each client includes a disk locator table 142 that maps a disk to the corresponding disk manager 134 and a file locator table 144 that maps a file to the corresponding disk 132 upon which the file resides. Although in the presently preferred embodiment the file locator table 144 and the disk locator table 142 are located on each client 131, it is within the scope of the invention for the tables 142 and 144 to reside on another network node.

Each of the disk managers 134 includes a manager locator table 146 that provides the location of the file system disk managers 134 and the network manager 136. An admission controller 148 is also located in the disk manager 134. The admission controller controls the admission process when a client 131 requests a file operation. File locking to ensure exclusive access to a file during a read or write operation is provided by a file access controller 150 that includes a circular queue 152 and a circular queue timer 154.

Referring to FIG. 6C, a client 131 initiates a file operation by locating the file and then sending a request to the associated disk manager 134. At step 156 the client 131 queries the file locator table 144 to determine upon which disk 132 the desired file is located. The client 131 then queries the disk locator table 142 at step 158 to find the disk manager 134 that is associated with the disk 132, step 158, sends a file request to that disk manager 134, step 160. The disk manager 134, upon receiving the request, verifies the client authentication key, step 162. When each client 131 is admitted to the network it receives an authentication key that provides limited access to the disks 132. The request is entered into the circular queue 152 and remains there until the file lock process described above is completed. Once the request advances to the top of the circular queue 152, the disk manager 134 checks the available disk bandwidth to determine if there is sufficient bandwidth to support the requested file operation, step 164. A message is sent to the network manager 136 requesting the allocation of sufficient network bandwidth to support the requested operation, step 166. The network manager 136 evaluates the request, step 168, and grants the request from the disk manager 134 if there is sufficient network bandwidth, step 170. After the request from the disk manager is granted, the network manager 136 and disk manager 134 update their corresponding bandwidth records to reflect the change to available bandwidth, step 172. The control information in the network manager mirror 140 and disk manager mirror 138 is then updated, step 174. The request from the client 131 is then granted, 176. Once the client completes the file operation, step 178, the file is closed, step 180. The disk manager and network manager bandwidth records are then modified to reflect that the resource has been relinquished, step 182.

Cooperative Distributed Servers

Figure 7A:
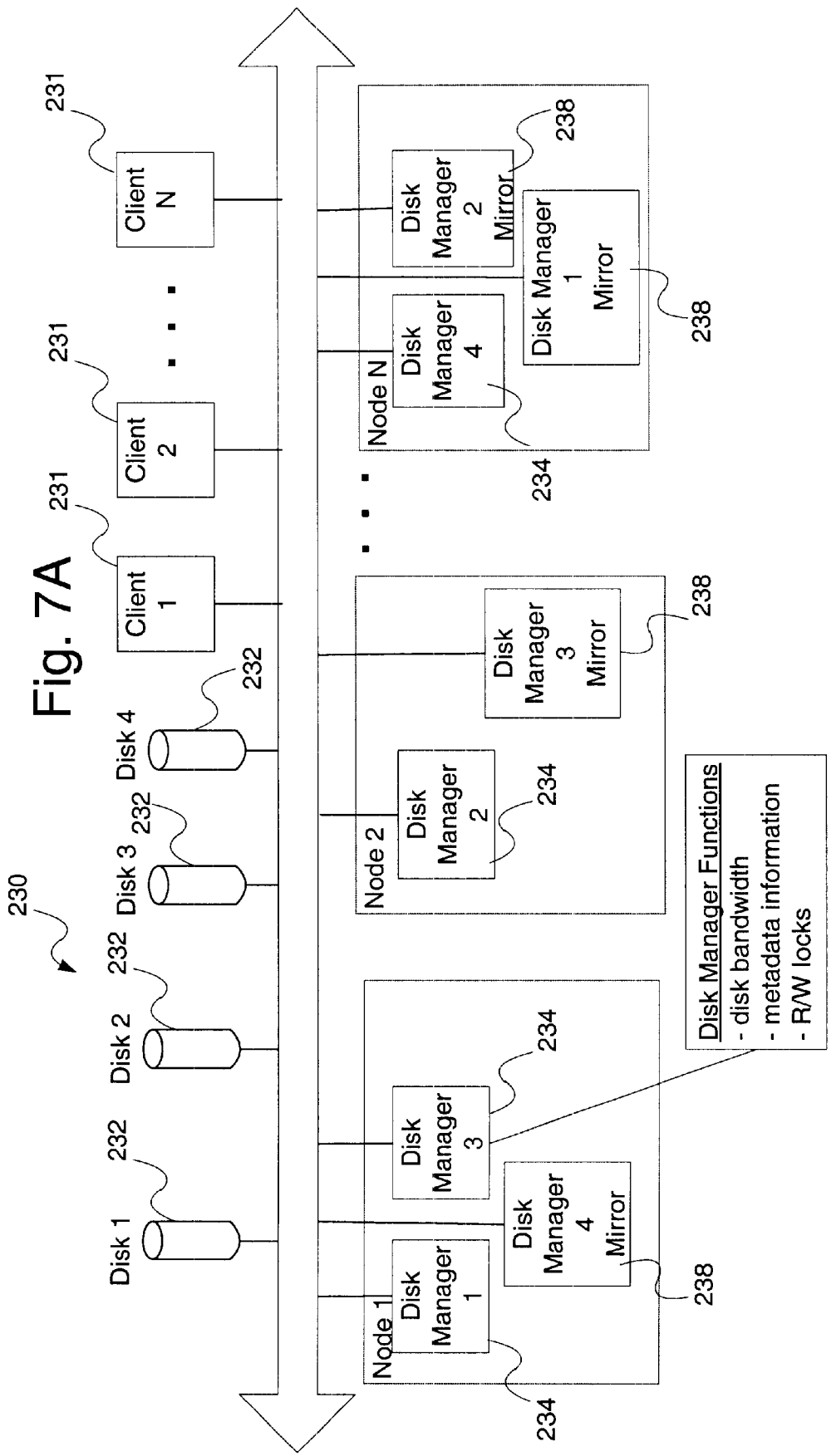
FIG. 7A is a block diagram of a presently preferred embodiment of a cooperative distributed server file system configured in accordance with the principles of the invention.

With reference to FIG. 7A, a cooperative distributed server file system 230 configured in accordance with the principles of the invention is illustrated. The cooperative distributed server file system 230 is similar to the dedicated distributed server file system 130 with corresponding elements numbered in the range 200–258, except that the network manager in the cooperative distributed server file system 230 is not statically assigned. Instead, the functions that are normally assigned to the network manager are cooperatively provided by the disk managers (DM) 234. The network management and scheduling functions are dynamically assigned to a disk manager 234 that is designated the current network manager (CNM) 236. Disk manager mirrors 238 for each of the disk managers 234 provide fault tolerance for the file system 230.

Figure 7B:
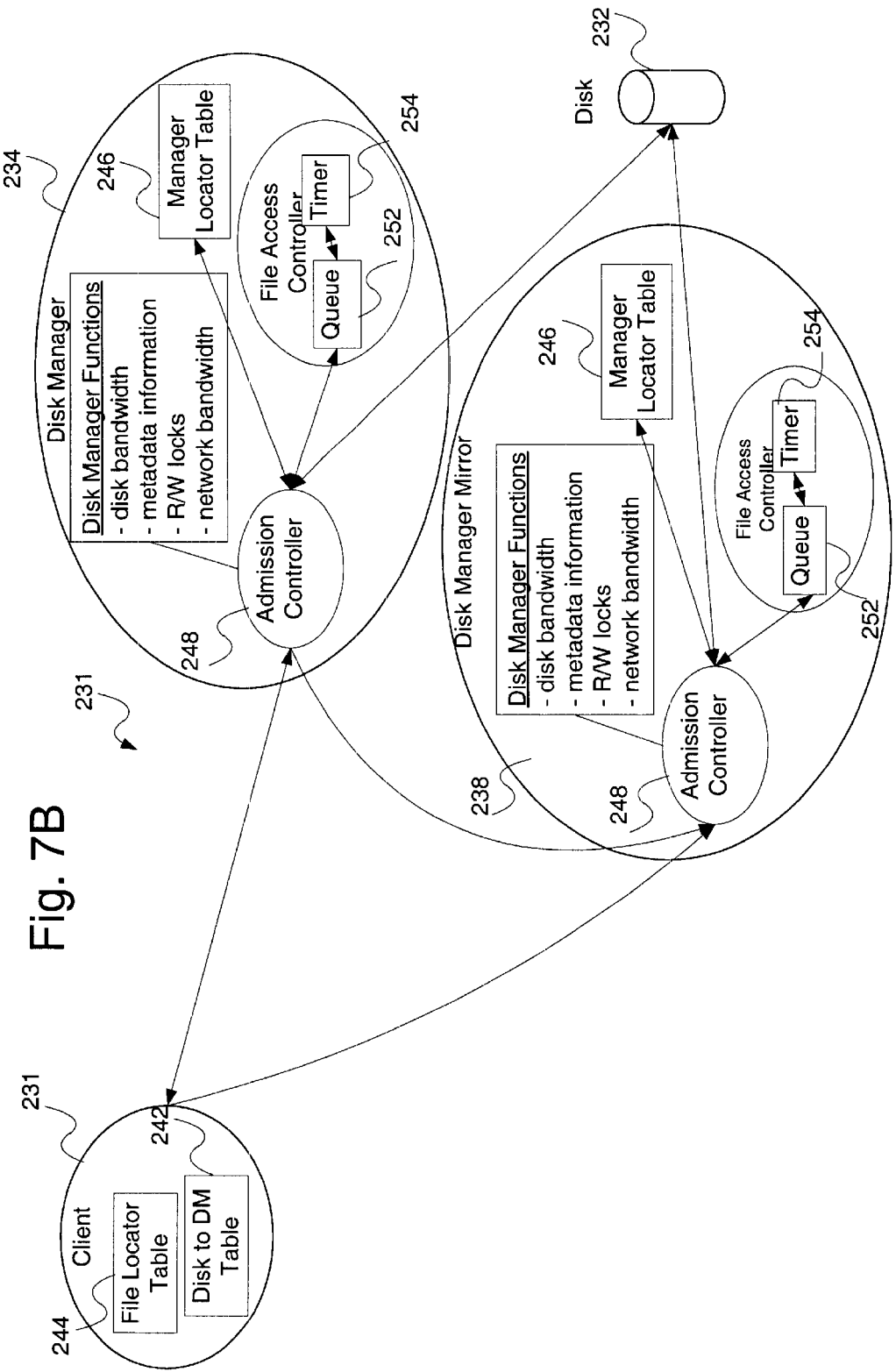
FIG. 7B is a detailed block diagram of a presently preferred embodiment of a cooperative distributed server file system configured in accordance with the principles of the invention.

With additional reference to FIG. 7B, a more detailed illustration of the cooperative distributed server file system 230 is provided. Again, the cooperative distributed server file system 230 is similar to the dedicated distributed server file system 130 with the exception that the network manager functions are dynamically assigned to a disk manager 234 that is designated the current network manager (CNM). Each of the disk managers 234 includes a manager locator table 246 that provides the location of the file system disk managers 234 and the current network manager. The admission controller 248 controls the allocation of network bandwidth in addition to the functions provided by the admission controller 148 in the distributed dedicated servers file system 130.

Figure 7C:
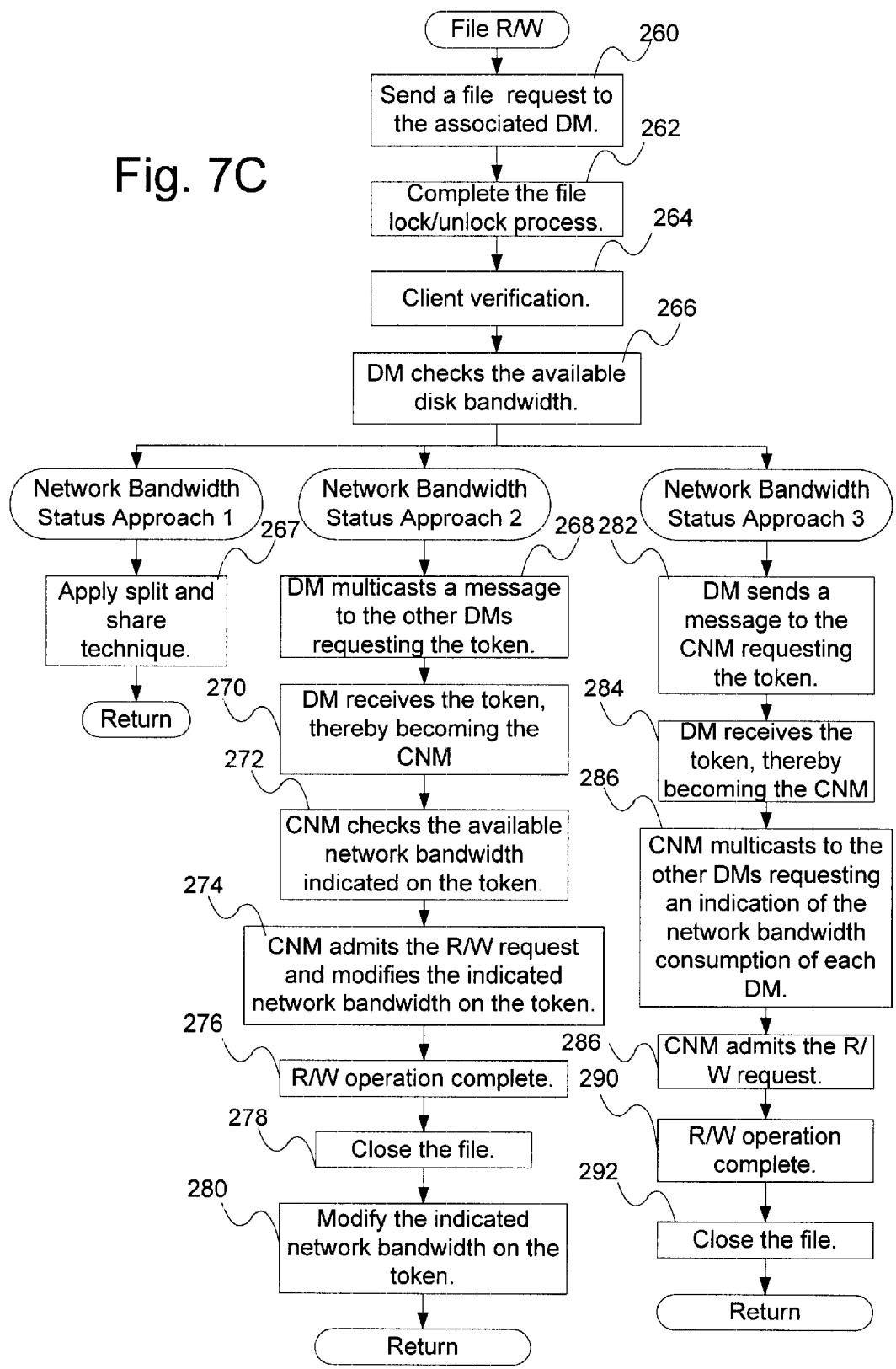
FIG. 7C is a sequence diagram illustrating a procedure for admission control of a file operation in a presently preferred embodiment of a cooperative distributed server file system configured in accordance with the principles of the invention.

Referring to FIG. 7C, a client 231 initiates a file operation in a similar manner to that employed in the dedicated distributed servers file system 130 by locating the file and then sending a request to the associated disk manager 234, step 260. The disk manager 234 places the request in the circular queue 252 wherein the request remains until the file lock process described above is completed, step 262. Once the request advances to the top of the circular queue, the file manager 234 verifies the client authentication key, step 264. The disk manager 234 checks the available disk bandwidth to determine if there is sufficient disk bandwidth to support the requested file operation, step 266. The network bandwidth status is then checked to determine if the requested file operation can be supported. Three approaches for determining the network bandwidth status are provided.

The first approach employs the split and share technique previously described in this specification for allocating network bandwidth and determining the network bandwidth status, step 267.

The second approach employs a token 235 that includes the current network bandwidth status. At step 268 the disk manager 234 associated with the requested file multicasts a message to the other disk managers 234 requesting the token 235. Upon receiving the token 235, the disk manager 234 becomes the current network manager 236, step 270. The current network manager 236 updates its associated disk manager mirror 238 to reflect the addition of the token 235 and then checks the available network bandwidth indicated on the token 235, step 272. Upon determining to grant the request from the client 231, the current network manager updates its associated disk manager mirror 238 and modifies the available network bandwidth indicated on the token 235 to reflect the new status, step 274. Once the file operation is complete, step 276, the file is closed, step 278, and the token 235 and disk manager 234 bandwidth records are then modified to reflect that the resource has been relinquished, step 280. In the presently preferred embodiment, the subsequent current network manager 236 modifies the token 235 to reflect the additional bandwidth that is available, however it is within the scope of the invention for the disk manager 234 associated with the file to modify the token 235.

The third approach employs a token 237 that enables the possessor to multicast a message to the other disk managers 234 requesting an indication of the network bandwidth consumption of each disk manager 234. At step 282, the disk manager 234 requests the token 237 from the current network manager 237, which is the last disk manager 234 to multicast requesting network bandwidth consumption information. Upon receiving the token 237, the disk manager 234 becomes the current network manager 237, step 284. The previous current network manager becomes the mirror 238 for the current network manager 237 which updates the mirror's 238 control information and multicasts to the other disk managers 234 requesting an indication of the network bandwidth consumption of each disk manager 234, step 286. Upon determining that there is sufficient network bandwidth to support the requested file operation, the current network manager 237 updates its associated mirror 238 and grants the request from the client 231, step 288. Once the file operation is complete, step 290, the file is closed, step 292, and the disk manager 234 bandwidth records are then modified to reflect that the resource has been relinquished.

Dynamic Disk Manager File System

Referring to FIG. 8A, a dynamic disk manager file system 300 for providing file services to a plurality of clients 304 is illustrated. The clients 304 are employed to share the network and file management tasks that are generally assigned to a server. The dynamic disk manager file system 300 is a low security system in which the clients 304 are trusted to regulate access to the files that are stored on disks 302. Clients 304 are dynamically assigned as the disk managers 306 and network managers 307 to share the load of bandwidth management. To provide fault tolerance, the previous disk manager and network manager are assigned as a disk manager mirror 308 and a network manager mirror 309 for the current disk manager 306 and network manager 307. To minimize network traffic and data structure maintenance, the administrative load that the clients 304 are burdened with is limited to a predetermined percentage of the client's 304 load.

In one embodiment, the disk manager responsibility is time multiplexed over all of the clients 304. In an alternative embodiment, a client 304 that requests to write to a file becomes the disk manager 306 of the corresponding disk 302. The client 304 continues to maintain the disk manager control information and complete the admission control and file maintenance duties until another client 304 requests to write upon the disk 302. It is within the scope of the invention to limit the time duration that the client 304 continues to be the disk manager 306 after completing the write operation. A predetermined time period after the client 304 becomes disk manager 306, any client that requests either a read or a write operation on the corresponding disk 302 becomes the new disk manager 306. The network manager responsibility is time multiplexed over all of the clients 304.

With additional reference to FIG. 8B, a detailed illustration of the clients 304 in the dynamic disk manager file system 300 is provided. The clients 304 include a file locator table 310 that maps a file to the corresponding disk 302 upon which the file resides. Although in the presently preferred embodiment the file locator table 310 is located on each client 302, it is within the scope of the invention for the file locator table 310 to reside on another network node.

The clients 304 also include the elements required to provide the file manager and network manager functions. These elements include an admission controller 312, a disk manager locator table 314, a circular queue 316, a circular queue timer 318, and a network manager locator table 322 as described in preceding sections of this specification. The client 304 also includes a network bandwidth determiner 320 for providing the network bandwidth status.

Figure 8C:
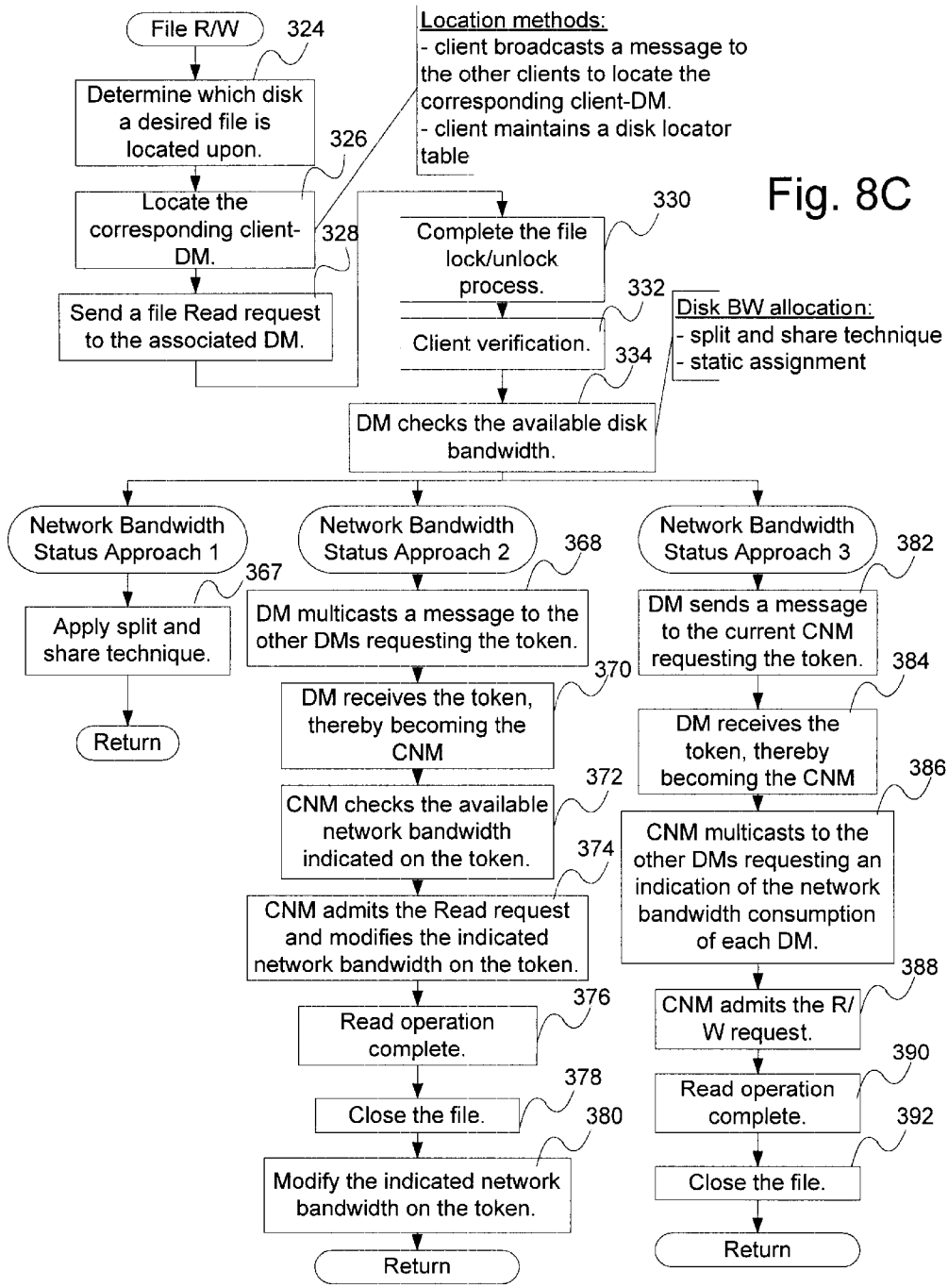
FIG. 8C is a sequence diagram illustrating a procedure for admission control of a file operation in a presently preferred embodiment of a dynamic disk manager file system configured in accordance with the principles of the invention.

Referring to FIG. 8C, the file operation process for the dynamic disk manager file system 300 is illustrated. To read a file, a client 304 queries the file locator table to determine on which disk the file is located, step 324. The client 304 then locates the corresponding disk manager 306, step 326. To locate the corresponding disk manager 306, the client 304 broadcasts a message to the other clients 304. In an alternative embodiment, the client queries a disk locator table that maps a file on a disk 302 to the corresponding disk manager 306. The client then sends the file operation request to the disk manager 306, step 328. The disk manager 306, upon receiving the request, enters it into the circular queue 316. The request remains in the queue 316 until the file lock process described above is completed, step 330. Once the request advances to the top of the circular queue 316, the disk manager 306 verifies the client authentication key, step 332. The disk manager 306 then checks the available disk bandwidth to determine if there is sufficient bandwidth to support the requested file operation, step 334. The network bandwidth status is then checked to determine if the requested file operation can be supported. The three approaches employed for determining the network bandwidth status in the dynamically changed disk manager file system 300 are similar to the approaches employed in the cooperative distributed server file system 230 with corresponding steps numbered in the range 367–392.

As described in the Fault Tolerance section, for any updates of control information the disk manager 306 and network manager first update the corresponding information in the disk manager mirror 307 and network manager mirror 309 before admitting a request from a client or process the lock updates.

The file manager mirror 307 is activated if a client request sent to a disk manager 306 is not processed within a predetermined time period. The file manager mirror 307 then becomes the new disk manager 306 and selects a new file manager mirror 307. The new disk manager broadcasts a message to the clients 304 and disk managers 306 providing notice of its new identity. All of the associated circular queue timers 318 and fault tolerance timers are then restarted.

Hybrid File System

Referring to FIG. 9A, a hybrid file system 400 is illustrated. The hybrid file system 400 is especially applicable in a scalable system where there might be a substantial increase in the number of nodes with a commensurate increase in file requests. In the hybrid file system 400 the system is divided into clusters 401. Each cluster 401 has only one disk 402, a cluster manager (CM) 404 and a set of file managers (FM) 406. The file management tasks for each disk 402 are split and shared between the statically assigned cluster manager 404 and the set of dynamically assigned file managers 406.

Providing multiple file managers 406 for each disk 402 reduces the load on individual file managers and permits scalability of the file system 400. The file manager 406 handles the file locking and other file maintenance issues for its corresponding files. One or more files is managed by the file manager 406, and every file in the file system 400 has a file manager 406. The file managers 406 are designated dynamically from the pool of clients 408. The number of file managers 406 in a cluster, range from one up to a limitless quantity. Increasing the number of file managers 406 balances the load more efficiently at the cost of additional network bandwidth.

Any client 408, can access any disk 402 in the entire system 400 for a read/write operation. Since the clients 408 are trusted to handle the tasks normally assigned to a server, the network environment is less secure than a file system with file managers assigned to servers.

The cluster manager is responsible for admission control, management of the file managers 406, maintenance of the free list, providing metadata information to the clients 408, and fault-tolerance issues. In addition to managing the clusters, the cluster managers 404 also cooperatively handle the network manager functions and tasks. The cluster managers in the presently preferred embodiment are selected from the original disk managers, however it is within the scope of the invention to select dedicated nodes.

Figure 9B:
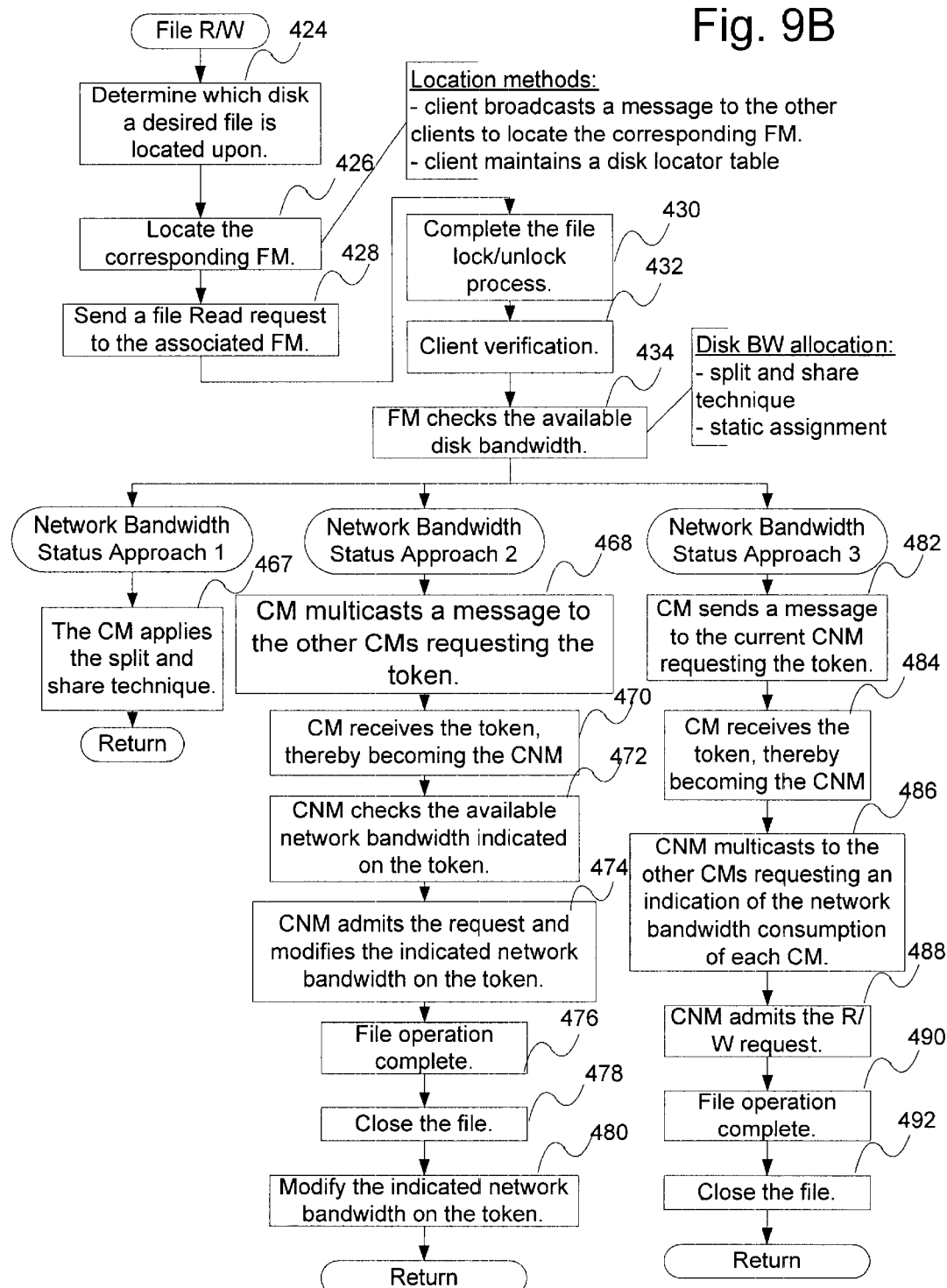
FIG. 9B is a sequence diagram illustrating a procedure for admission control of a file operation in a presently preferred embodiment of a hybrid file system configured in accordance with the principles of the invention.
Figure 9C:
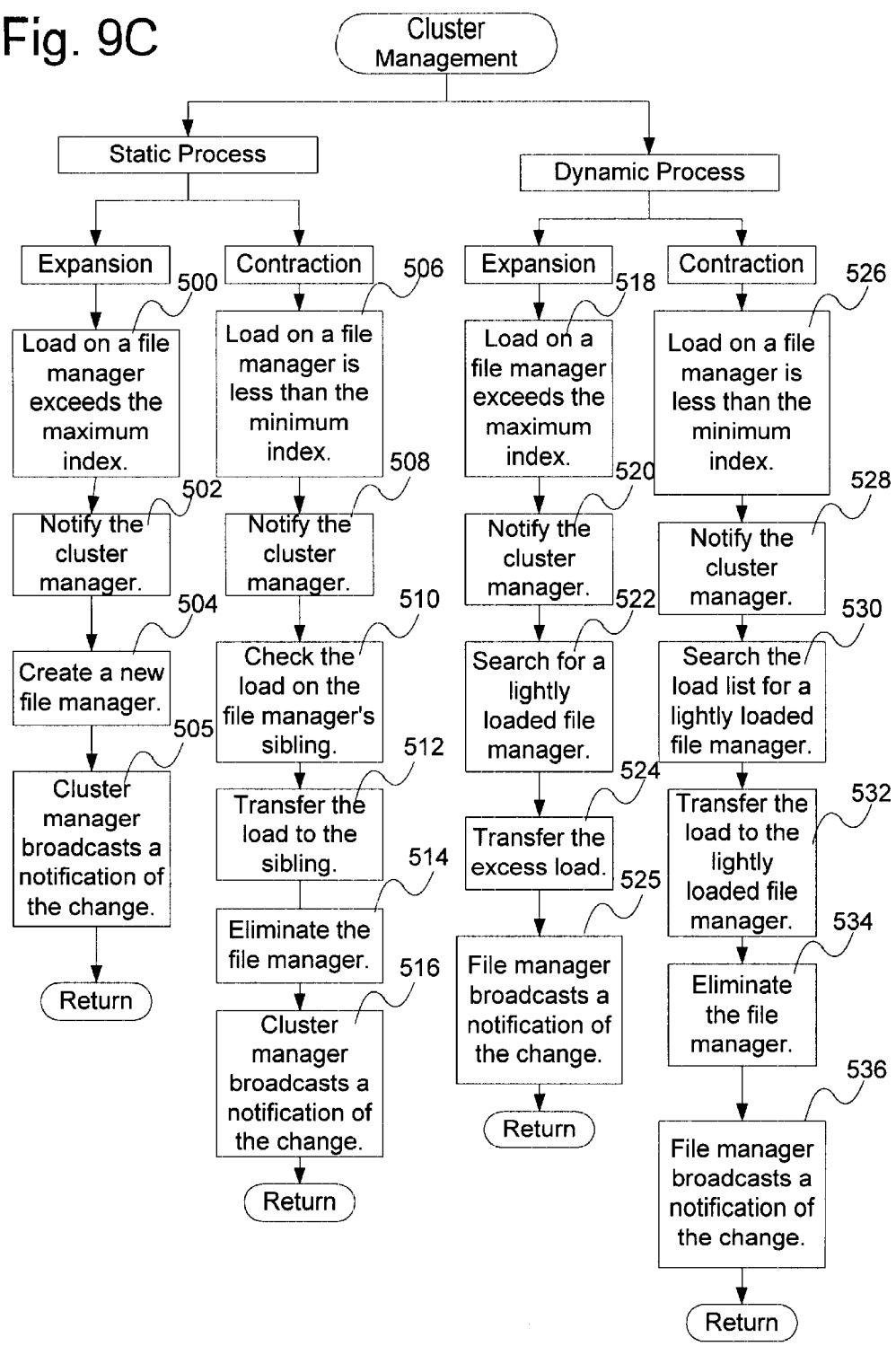
FIG. 9C is a sequence diagram illustrating a procedure for managing the expansion and contraction of a cluster in a presently preferred embodiment of a hybrid file system configured in accordance with the principles of the invention.
Figure 9D:
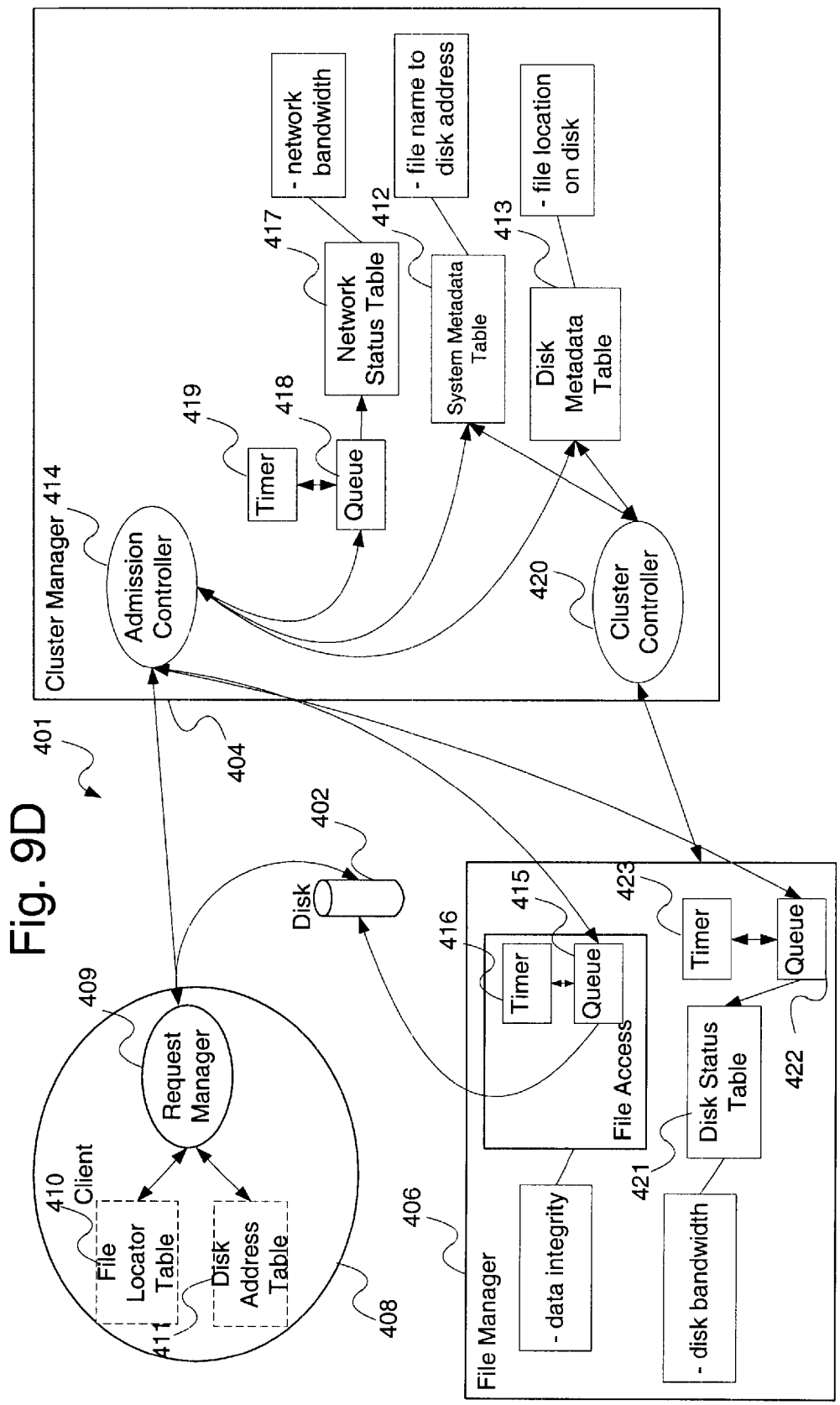
FIG. 9D is a detailed block diagram of a presently preferred embodiment of a hybrid file system configured in accordance with the principles of the invention.

With additional reference to FIG. 9D, a detailed illustration of a cluster 401 of the hybrid file system 400 is provided. The client 408 includes a request manager 409 for sending a request for a file operation to the cluster manager 404. Although, in the presently preferred embodiment a file locator table 410 and disk address table 411 are not cached onto the client 408, it is within the scope of the invention to include both tables 410 and 411 in the client 408. Instead of locating the system and disk metadata on the client 408, it is included in the cluster manager 404 as the system metadata table 412 and the disk metadata table 413. An admission controller 414 in the cluster manager 404 controls the admission of requests from the clients 408. A network status table 417 with associated network status queue 418 and network status timer 419 provide network bandwidth information with a locking mechanism that operates as previously described. A cluster controller 420 regulates the expansion and contraction of the cluster in response to the activities associated with files that reside on the disk 402 within the cluster 401. Each file manager 406 in the cluster 401 includes a disk status table 421 with a disk status table 422 and disk status timer 423 for providing disk bandwidth information. The file managers also include a file access queue 415 with an associated file access timer 416 that provide locking/unlocking of the file to ensure data integrity as described in preceding sections of this specification for other embodiments of the invention.

Referring to FIG. 9B, the admission control process for the hybrid file system 400 is illustrated. The admission control process for the hybrid file system 400 is similar to the admission process for the dynamic disk manager file system 300 except for splitting the disk manager and network manager functions between a file manager and a cluster manager. The hybrid file system admission control process has corresponding steps numbered in the range 424 to 492. The disk bandwidth allocation and determination is accomplished using the split and share technique at the file manager level. The network bandwidth allocation and management is accomplished using the split and share technique at the cluster level.

Cluster Management

Within a cluster 401, the number of file managers 406 changes dynamically in response to the bandwidth usage for file operations related to the files residing on the cluster disk 402. Thus the size of a cluster 401 expands or contracts on the basis of the load. The cluster manager 404 manages the expansion and contraction process and broadcasts a notification of cluster changes to the clients 408. The scope of the invention includes both static and dynamic methods of carrying out the expansion and contraction process as well as the subsequent notification.

Static Expansion and Contraction Process

A new file manager is created when the load on a file manager 406 increases beyond a predetermined maximum index. Some of the files managed by the overloaded file manager 406 are transferred to the control of a client 408, thus creating a new file manager. Only clients that currently are not a file manager 406 are selected to become new file managers. During the cluster expansion process the initial load of a newly created file manager is determined in a binary tree fashion. The list of files in the cluster 401 is statically divided and allocated such that all the leaves, file managers 406, of the tree have a fixed set of files to manage. The file list and tree configuration is provided to a client 408 when it enters the hybrid file system 400. A client 408 that knows the tree configuration can derive which files are managed by a selected file manager 404.

A cluster expansion is executed when the load on a file manager 406 increases beyond a predetermined maximum load index, step 500. The overloaded file manager 406 notifies the cluster manager 404 that the maximum load index has been exceeded, step 502. The cluster manager 404 creates a new file manager to manage a portion of the overloaded file manager's load, step 504. The cluster manager 404 then distributes one-half of the file manager's load to the newly formed file manager. Thus, at each level of the binary tree the leftmost node is the same parent node (original file manager 406). The cluster manager 404 then broadcasts a notification to the clients 408 that use the selected files of the change in file manager 406 configuration, step 505.

The file manager binary tree structure is maintained by the cluster manager 404. Each of the file managers 406 knows the identity of their sibling. Because management of files is used for transferring load, the distribution of the load may or may not be equal among the two siblings formed during the expansion process.

The contraction process of the clusters is just the reverse of the expansion process. When the load on-a file manager 406 decreases below a predetermined minimum load value, the file manager 406 notifies the cluster manager 404, steps 506 and 508. The cluster manager 404 checks the load of the file manager's sibling to determine if the combined load is below the predetermined minimum load value, step 510. If the combined load is less than the minimum load value, then the cluster manager transfers the load from the lightly loaded file manager 406 to the other file manager (sibling) 406, step 512, and eliminates the lightly loaded file manager, step 514. The cluster manager 404 then broadcasts a notification to the clients 408 that use the selected files of the change in file manager 406 configuration, step 516.

Dynamic Expansion and Contraction Process

An alternative embodiment accomplishes the expansion/contraction process through a dynamic operation. In this embodiment, the cluster manager 404 maintains a load list of the file managers that is ordered relative to file manager load values. The load list is used by the cluster manager 406 to locate heavily loaded and lightly loaded clients 408. When the load on a file manager 406 exceeds a predetermined maximum load index, the file manager 406 notifies the cluster manager 404, steps 518 and 520. Alternatively, the cluster manager 404 searches from the top of the load list for file managers having a load value that is beyond the maximum load value and would therefore need to transfer management of a portion of its associated files. The cluster manager 404 searches the load list for a lightly loaded file manager, step 522. If there are no lightly loaded file managers, the cluster manager 404 selects a client 408 that is not a file manager 406 and transfers a portion of the load from the loaded file manager 406 to the newly formed file manager, step 524. Following the cluster, expansion, the new file manager 406 notifies the clients 408 that use the affected files of the change in file manager status, step 525.

Similarly, when a file manager's load decreases below minimum load value, the file manager 406 notifies the cluster manager 404, steps 526 and 528. The cluster manager 404 then searches for a file manager that is able to accept the additional load without exceeding the maximum load value, step 530. If such a file manager 406 is found, the transfer is made and the lightly loaded file manager 406 is released, steps 532 and 534. For a contraction process, the cluster manager 404 searches for two or more file managers 406 from the bottom of the load list. Following the cluster contraction, the modified file manager 406 notifies the clients 408 that use the affected files of the change in file manager status, step 536.

While contracting or expanding, the file manager 406 load is adjusted by transferring the management tasks of selected files. Furthermore, after expansion the new file manager remains under the control of the cluster manager 404 that introduced it as a file manager 406.

Fault Tolerance

A cluster manager mirror 405 is created at another cluster manager 404 to provide fault tolerance for the cluster manager 404. It is within the scope of the invention to create a cluster manager mirror 405 at a dedicated back-up network node. When a cluster manager 404 fails, a new cluster manager is activated from the cluster manager mirror 405. Fault tolerance for the file managers 406 is provided by the associated cluster manager 404 maintaining a back-up for each file manager 406 in the cluster 401. An alternative means for protecting the file manager 406 is for the file manager 406 to maintain a file manager mirror 407 at the file manager 406 from which its load was transferred. When a file manager 406 fails, the corresponding cluster manager 404 transfers the file information to another file manager 406 as if expanding the cluster 401.

Security

The hybrid file system 400 is employed in an environment where security is not a major concern. An access key is provided by the cluster manager 404 during admission control to a client 408 that is admitted. The access key includes metadata information such as the block addresses to which the client 408 may read or write.

Serverless File Systems

A serverless system is employed in an environment where security is not a major concern. In the serverless system there are no servers, instead the functionality of the server is distributed in a self-service fashion. Based on the system status, a client completes its own admission control and resource allocation and shares the load involved in maintaining data consistency. Serverless systems are highly scalable and have virtually no performance bottlenecks. Server fault-tolerance issues are non-existent in serverless systems; the failure of a client does not affect other clients.

Passive Disk, Serverless File System

Referring to FIG. 10A, a passive disk serverless file system 600 for providing file services to a plurality of clients 604 is illustrated. In the passive disk serverless system 600, the information necessary for admission control and data consistency management is stored on the disks 602. On each disk 602 a portion of the disk cache and a small amount of bandwidth are reserved for storing and retrieving control information for the file system 600. One disk in the passive disk serverless file system 600, referred to as the network data disk 606, includes a network status table 607 for maintaining the network bandwidth information. Also stored on a single disk, referred to as the system data disk, 610, is a system metadata table 612 for mapping a file name to a disk address.

Figure 10B:
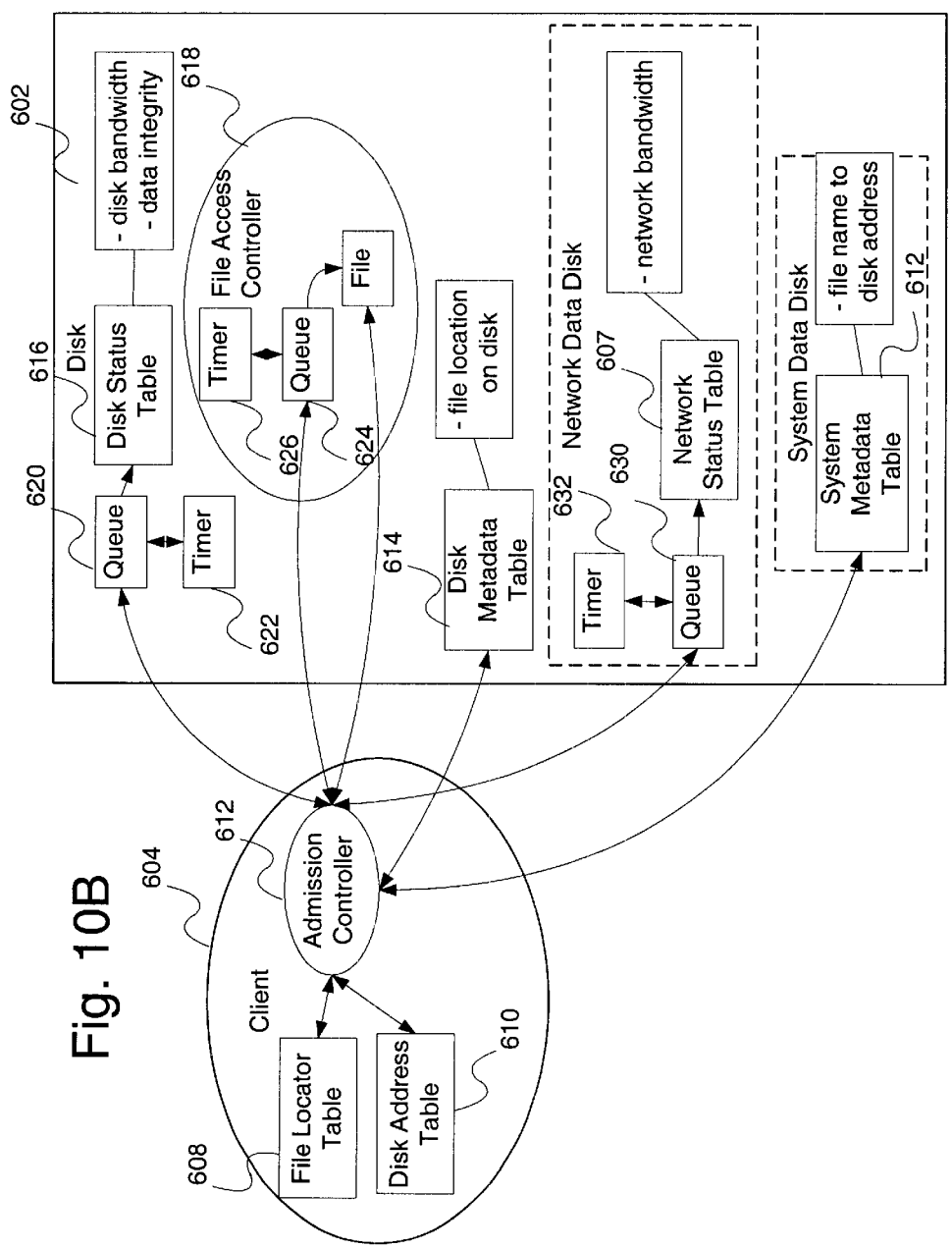
FIG. 10B is a detailed block diagram of a presently preferred embodiment of a passive disk serverless file system configured in accordance with the principles of the invention.

With additional reference to FIG. 10B, a datagram of the passive disk serverless file system 600 is provided. The client 604 caches the system level metadata information in a file locator table 608 that maps file names to disk addresses. Although the system level metadata is cached on the client 604, it is within the scope of the invention to maintain a single system level metadata table for the file system 600, to which the client 604 sends a request for mapping a file to a disk. To map the file to a location on the specified disk, a disk address table is cached on the client 604 from a disk metadata table. It is also within the scope of the invention to maintain a single disk metadata table for the file system 600. An admission controller 612 controls the client admission process.

The disk 602 includes a file access controller 618 for limiting access to files residing on the disk 602 and a disk status table for providing disk bandwidth and data integrity information. File locking to ensure exclusive access to the file access controller 618 during a file read or write operation is provided by a file access queue 624 and a file access queue timer 626. File locking is also provided for accesses to the disk status table 616; the locking mechanism is provided by a disk status queue 620 and a disk status queue timer 622. Also included is a disk metadata table 614 for mapping a file to an address on the disk 602.

The network data disk 606 includes a network status queue 630 and network status timer 632 to provide file locking during accesses to the network status table 608.

Figure 10C:
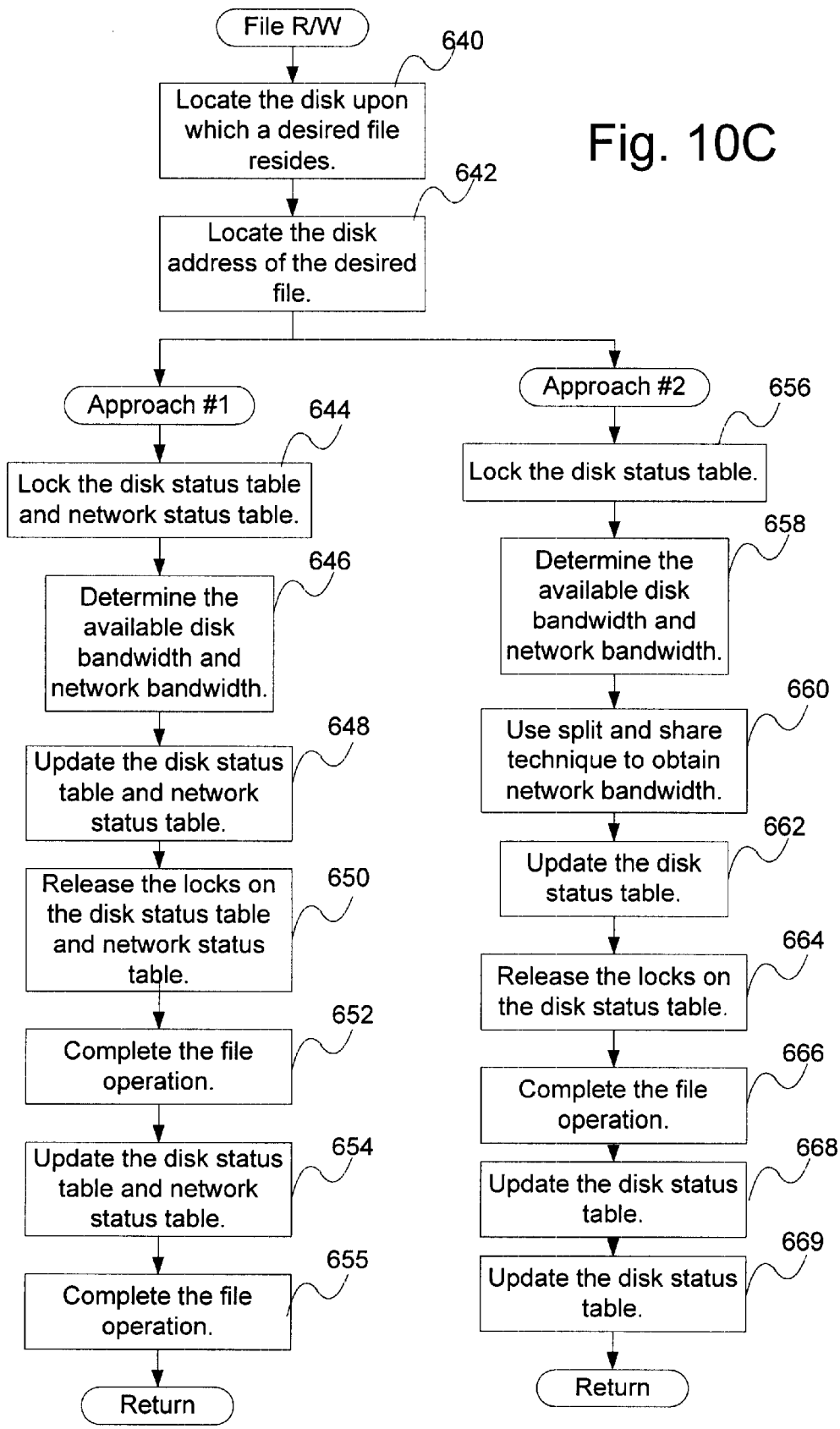
FIG. 10C is a sequence diagram illustrating a procedure for admission control of a file operation in a presently preferred embodiment of a passive disk serverless file system configured in accordance with the principles of the invention.

Referring to FIG. 10C, a client 604 initiates a file operation by determining the disk 602 upon which a desired file resides, step 640. The file locator table 608 on the client 604 is queried to determine the disk 602 the file resides upon. However, if the data in the file locator table 608 is old, then the client refreshes the system metadata in table 608 from the system metadata table 612 on the system data disk 610. It is within the scope of the invention to not cache the system metadata on the client 604, and instead query the system metadata table 612 on the system data disk 610 to determine the disk 602 upon which the file resides. The address of the file on the disk 602 is determined next, step 642. The disk metadata in the disk address table 610 on the client 604 is queried to determine the disk address. However, if the data in the disk address table 610 is old, then the client refreshes the disk metadata instable 610 from the disk metadata table 614 on the disk 602. However, it is within the scope of the invention to query the disk metadata table 614 of the disk 602 on which the file resides to determine the disk address. Once the disk address corresponding to a desired file is obtained, the availability of network and disk bandwidth is then determined. In the presently preferred embodiment a network status table 607 located on the network data disk 606 is employed to determine the available network bandwidth. However, it is within the scope of the invention to use the split and share technique described earlier for the network bandwidth determination and allocation.

In the first approach for bandwidth determination, the disk status table 616 and network status table 607 are locked while being read to ensure data integrity, step 644. The locking technique that is employed is similar to the technique described in an earlier section of this specification with a somewhat shorter expiration time period. However, it is within the scope of the invention to provide a longer expiration time period or a user adjustable time period. Also, in the presently preferred embodiment, locking is employed during both read and write file operations, however it is within the scope of the invention to only apply locking during a write operation. After acquiring access to the disk status table 616 and the network status table 607, the client 604 determines the available bandwidth, step 646. If there is sufficient bandwidth, the client 604 updates the disk status table 616 and network status table 607 to reflect the increased load, step 648. After updating, the locks on both tables 607 and 616 are released, step 650. Once the file operation is complete, step 652, the disk status table 616 and network status table 607 are updated to reflect the decreased load, step 654. Also, if the file operation is a write, the system metadata table 612 and the disk metadata table 614 are updated and a message is broadcast to the clients 604 updating the cached copies of tables 612 and 614, step 655. Instead of broadcasting updated copies of the metadata, an alternative approach is to invalidate the copies of the system level metadata existing at the clients.

In the second approach for bandwidth determination, the disk status table 616 is locked while being read to ensure data integrity, step 656. Again, the locking technique that is employed is similar to the technique described in an earlier section of this specification with a somewhat shorter expiration time period and it is employed for both read and write file operations. After acquiring access to the disk status table 616, the client 604 determines the available disk bandwidth and network bandwidth, step 658. Using this approach, the disk status table 616 maintains a record of the network bandwidth that is assigned to the disk 602. If the disk 602 does not have a sufficient network bandwidth, then the split and share technique is employed to obtain additional network bandwidth, step 660. If there is sufficient disk and network bandwidth, the client 604 updates the disk status table 616 to reflect the increased load, step 662. After updating, the lock on the disk status table is released, step 664. Once the file operation is complete, step 666, the disk status table 616 is updated to reflect the decreased disk and network load, step 668. If the file operation is a write the metadata is updated as described above in the first approach, step 669.

Semi-Active Disk, Serverless File System

Figure 11A:
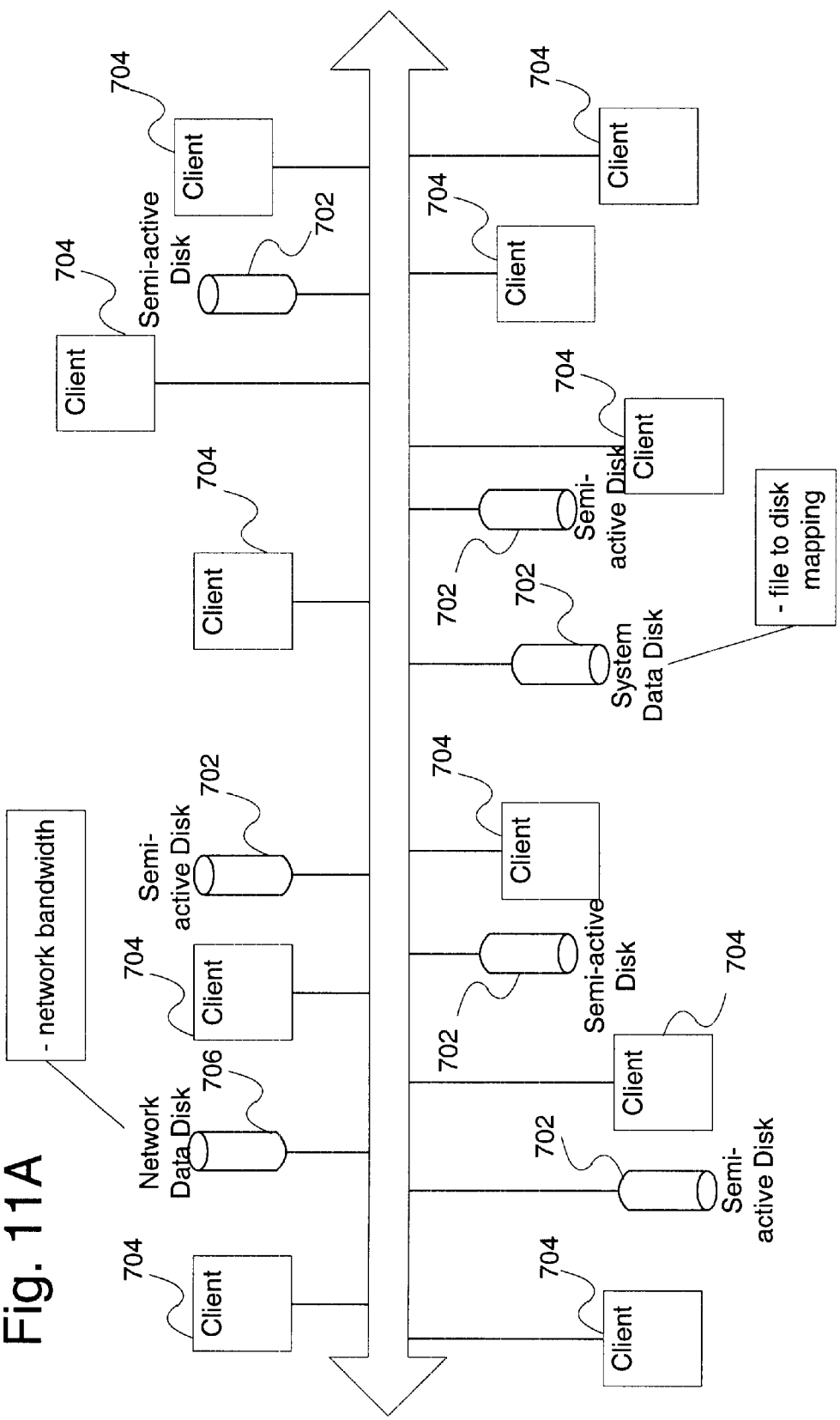
FIG. 11A is a block diagram of a presently preferred embodiment of a semi-active disk serverless file system configured in accordance with the principles of the invention.
Figure 11B:
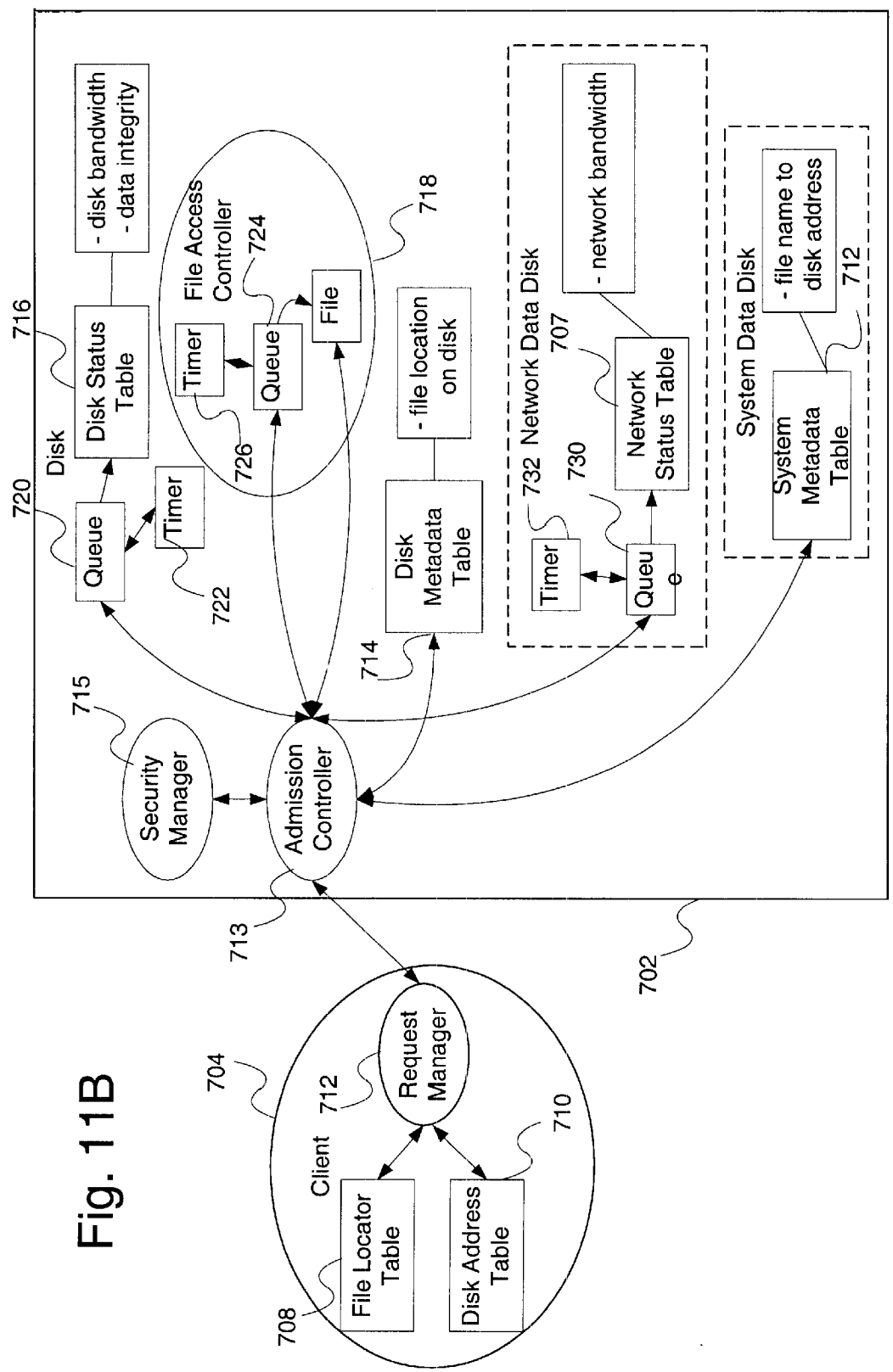
FIG. 11B is a detailed block diagram of a presently preferred embodiment of a semi-active disk serverless file system configured in accordance with the principles of the invention.

Referring to FIG. 11A, a semi-active disk serverless file system 700 for providing file services to a plurality of clients 704 is illustrated. The semi-active disk serverless system 700 is similar to the passive disk serverless file system with the exception that a semi-active disk 702 manages the admission process in response to a request from a client 704. The semi-active disk serverless system 700 additionally includes system security during file accesses such as requiring an authentication key from clients 704. The information necessary for admission control and data consistency management as well as the admission controller is stored on the semi-active disks 702. A network data disk 606 maintains the network bandwidth information. A system data disk 710 provides system metadata such as the disk address that corresponds to a file name.

With additional reference to FIG. 10B, a datagram of the semi-active disk serverless file system 700 is provided. The client 704 caches the system level metadata information in a file locator table 708 that maps file names to disk addresses. Although the system level metadata is cached on the client 704, it is within the scope of the invention to maintain a single system level metadata table for the file system 700, to which the client 704 sends a request for mapping a file to a disk. To map the file to a location on the specified disk, a disk address table is cached on the client 704 from a disk metadata table. It is also within the scope of the invention to maintain a single disk metadata table for the file system 700. A request manager 712 sends the client request to the semi-active disk 702.

The semi-active disk 702 includes an admission controller 713 for managing the admission process for a request from a client 704. A file access controller 718 limits access to files residing on the disk 702 and a disk status table 716 provides disk bandwidth and data integrity information. File locking to ensure exclusive access to the file access controller 718 during a file read or write operation is provided by a file access queue 724 and a file access queue timer 726. The file locking process is similar to the previously described process, except the semi-active disk 702 handles the timeout and refreshing of the locks. File locking is also provided for accesses to the disk status table 716; the locking mechanism is provided by a disk status queue 720 and a disk status queue timer 722. Also included is a disk metadata table 714 for mapping a file to an address on the disk 702.

The network data disk 606 includes a network status queue 630 and network status timer 632 to provide file locking during accesses to the network status table 608.

Figure 11C:
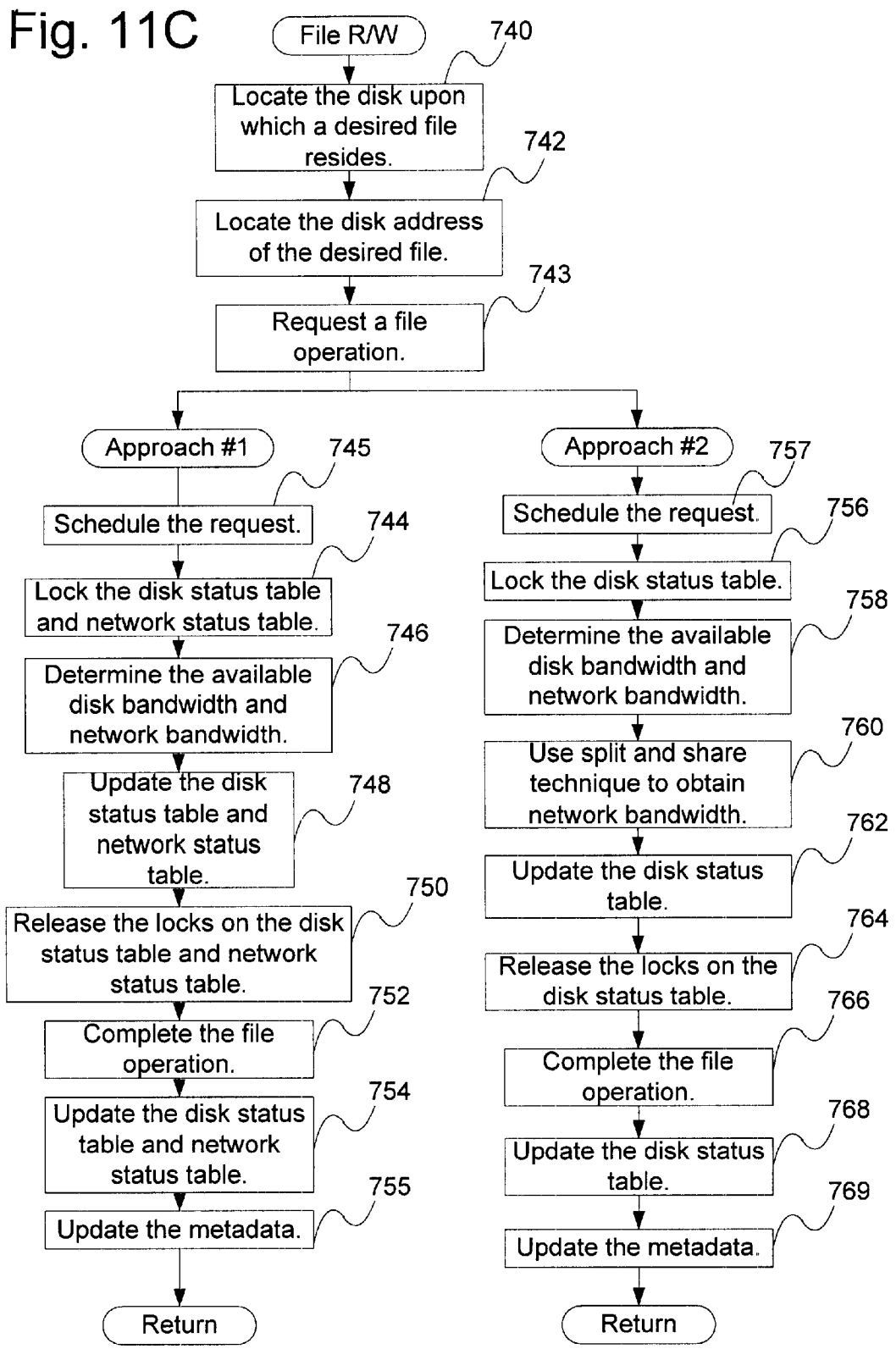
FIG. 11C is a sequence diagram illustrating a procedure for admission control of a file operation in a presently preferred embodiment of a semi-active disk serverless file system configured in accordance with the principles of the invention.

Referring to FIG. 11C, a file operation in the semi-active disk serverless file system 700 is similar to a file operation in the passive disk serverless file system 600 with corresponding elements numbered in the range from 740 to 769. The semi-active disk serverless file system 700 differs from the passive disk serverless file system 600 in that admission control, request scheduling, file system security, and free list management are performed by the semi-active disk 702. Once the disk address corresponding to a desired file is obtained, steps 740 and 742, the client 704 sends a file operation request to the disk 702, step 743. The admission controller 713 in the disk 702 verifies the client 704 authentication key and schedules the request for processing, steps 745 and 757. Encryption hardware in the disk 702 assists in the key authentication. For write requests the admission controller provides free block addresses to the client 704. The remainder of the admission control process remain similar to the process in the passive disk serverless file system 700 with the specified exception of the admission controller function shifting onto the disk 702.

While the invention has been described in its presently preferred embodiments, it will be understood that the invention is capable of certain modification and change without departing from the spirit of the invention as set forth in the appended claims.

What is claimed is:

1. A file system for a multi-media storage system operable to communicate information over a network with a plurality of multimedia clients, said network having an available network bandwidth, the file system comprising:

a cluster for defining a grouping of network components; said cluster comprising;

a cluster manager assigned to one of said multimedia clients, having an associated network storage device coupled to said network for storing and retrieving at least one file, said network storage device having an available disk bandwidth, said cluster manager comprising;

an admission controller, operable in response to a file request from a multimedia client for a file operation upon a selected file, to control admission of said file request;

a network status determiner, activable in response to a network bandwidth request from said admission controller, to determine the available network bandwidth; and at least one file manager associated with said network storage device, said at least one file manager located on one of said clients, for managing file maintenance procedures of said at: least one file and including a disk status determiner, activable in response to a disk bandwidth request from the admission controller, to determine the available disk bandwidth;

wherein, said admission controller, in response to said file request, sends said network bandwidth request and said disk bandwidth request to determine whether said available network bandwidth and said available disk bandwidth are sufficient to support the requested file operation.

2. The file system of claim 1 further comprising a system metadata table for providing a disk location of said at least one files, wherein said client queries the system metadata table to determine the disk where the selected file is located.

3. The file system of claim 1 wherein said at least one file manager further comprises a write lock manager, operable to prevent more than one of said at least one client from simultaneously writing to said selected file.

4. The file system of claim 3 wherein the write lock manager further comprises a write circular buffer for storing a write request for said selected file such that said write request is serviced on a first stored first served basis.

5. The file system of claim 3 wherein the write lock manager further comprises a read circular buffer for storing a read request for said selected file such that said read request is serviced on a first stored first served basis.

6. The file system of claim 1 wherein the cluster manager further includes a cluster controller for regulating the creation and deletion of said at least one file manager and a broadcaster for notifying the at least one clients of the creation or deletion of said file manager.

7. The file system of claim 1 wherein said file manager includes a load notifier for providing a notification to the cluster manager that the available disk bandwidth of one of said at least one file managers is greater than a load index level; and said cluster manager further includes a cluster controller, responsive to said notification, for creating a file manager to provide additional disk bandwidth such that the available disk bandwidth for both of the file managers is greater than the load index level.

8. The file system of claim 1 wherein said file manager includes a load notifier for providing a notification to the cluster manager that the available disk bandwidth of one of the at least one file managers having a loaded bandwidth is less than a bandwidth index level; and said cluster manager further includes a cluster controller, responsive to said notification, for eliminating said file manager such that the loaded bandwidth of said file manager is transferred to another of said at least one file managers decreasing the available disk bandwidth of said another file manager.

9. The file system of claim 1 further comprising a file manager mirror corresponding to each, of said at least one file managers.

10. The file system of claim 1 further comprising a cluster manager mirror corresponding to each of said cluster managers.

11. The file system of claim 10 further comprising a network bandwidth scheduler for allocating network bandwidth by multiplexing file operations corresponding to said file request.

12. The file system of claim 1 further comprising a security manager for limiting access to said at least one network storage device by said at least one client.

13. A file system for a multi-media storage system operable to communicate information over a network having an available network bandwidth, the file system comprising:

at least one network storage device coupled through the network to at least one multi-media client, each of said at least one network storage devices having an available disk bandwidth and including at least one file;

a cluster manager located on one of said at least one clients for managing a cluster, one of said cluster manager corresponding to each of said at least one network storage devices, said cluster manager including;

an admission controller, operable in response to a request for a file operation upon a selected file, said request from one of said at least one clients, to control admission of said request; and a network status determiner, activable in response to a network bandwidth request from the admission controller, to determine the available network bandwidth;

at least one file manager located on one of said at least one clients for managing file maintenance procedures of said file located on said network storage device, said at least one file manager including;

a disk status determiner, activable in response to a disk bandwidth request from the admission controller, to determine the available disk bandwidth;

a file access queue for ensuring data integrity; and a file access timer coupled to the file access queue; and said cluster manager further including a cluster controller for regulating the creation and deletion of said at least one file manager;

wherein, said admission controller, in response to said request, sends said network bandwidth request and said disk bandwidth request to determine whether said available network bandwidth and said available disk bandwidth is sufficient to support the requested file operation.

14. The file system of claim 13 further comprising a disk scheduler for scheduling read and write operations to the at least one network storage device.

15. A method of managing a file request in a file system for a multi-media storage system operable to communicate information over a network having an available quantity of network bandwidth, said network including at least one multi-media client and at least one network storage device having an available quantity of disk bandwidth with at least one file having a disk location, the method comprising the steps of:

determining the disk location of a selected file;

providing a cluster manager corresponding to each of said at least one network storage devices, said cluster manager having an admission controller for controlling access to said selected file;

providing a file manager located on one of said at least one clients for managing file maintenance procedures of corresponding files located on said network storage device;

sending a request for a file operation to said admission controller, requesting to perform a file operation upon said selected file;

determining the available disk bandwidth;

determining the available network bandwidth;

evaluating the request based upon whether the available disk bandwidth and the available network bandwidth are sufficient to support the requested file operation; and granting the request.

16. The method of claim 15 wherein the step of determining the disk location of a selected file includes querying a file locator table connected to at least one of said at least one client.

17. The method of claim 15 wherein the step of determining the disk location of a selected file includes querying a disk metadata table included in the cluster manager.

18. The method of claim 15 wherein the step of determining the available network bandwidth comprises:

locking a network status table that lists the available network bandwidth;

applying a split and share technique to determine the available network bandwidth; and unlocking the network status table.

19. A file system for a multi-media storage system operable to communicate information over a network with a plurality of multimedia clients, said network having an available network bandwidth, the file system comprising:

at least one network storage device coupled to said network for storing and retrieving at least one file, said network storage device having an available disk bandwidth, a disk manager associated with said network storage device located on one of said clients, said disk manager for managing file maintenance procedures of said at least one file and including;

an admission controller, operable in response to a file request from one of said clients for a file operation upon a selected file, to control admission of said file request; and a disk status determiner, activable in response to a disk bandwidth request from the admission controller, to determine the available disk bandwidth; and a network manager assigned to one of said multimedia clients, for providing network services, said network manager including a network status determiner, activable in response to a network bandwidth request from said admission controller, to determine the available network bandwidth;

wherein, said admission controller, in response to said file request, sends said network bandwidth request and said disk bandwidth request to determine whether said available network bandwidth and said available disk bandwidth are sufficient to support the requested file operation.

20. The file system of claim 19 further comprising a system metadata table for providing a disk location of said at least one files, wherein said client queries the system metadata table to determine the disk where the selected file is located.

21. The file system of claim 19 wherein said at least one disk manager further comprises a write lock manager, operable to prevent more than one of said at least one client from simultaneously writing to said selected file.

22. The file system of claim 21 wherein the write lock manager further comprises a write circular buffer for storing a write request for said selected file such that said write request is serviced on a first stored first served basis.

23. The file system of claim 21 wherein the write lock manager further comprises a read circular buffer for storing a read request for said selected file such that said read request is serviced on a first stored first served basis.

24. The file system of claim 19 wherein said plurality of clients further include a disk manager locator table for providing a location of said disk manager.

25. The file system of claim 19 further comprising a disk manager mirror corresponding to said disk manager.

26. The file system of claim 19 further comprising a network manager mirror corresponding to said network manager.

27. A file system for a multi-media storage system operable to communicate information over a network with a plurality of multimedia clients, said network having an available network bandwidth, the file system comprising:
- at least one network storage device coupled to said network for storing and retrieving at least one file, said network storage device having an available disk bandwidth,
- a system metadata table for providing a disk location of said at least one files;
- a disk manager associated with said network storage device located on one of said clients, said disk manager for managing file maintenance procedures of said at least one file and including;
  - an admission controller, operable in response to a file request from one of said clients for a file operation upon a selected file, to control admission of said file request;
  - a disk status determiner, activable in response to a disk bandwidth request from the admission controller, to determine the available disk bandwidth;
  - a write lock manager, operable to prevent more than one of said at least one client from simultaneously writing to said selected file; and
  - a write circular buffer for storing said file request for said selected file such that said file request is serviced on a first stored first served basis; and
- a network manager assigned to one of said multimedia clients, for providing network services, said network manager including a network status determiner, activable in response to a network bandwidth request from said admission controller, to determine the available network bandwidth;
- wherein, said admission controller, in response to said file request, sends said network bandwidth request and said disk bandwidth request to determine whether said available network bandwidth and said available disk bandwidth are sufficient to support the requested file operation.

28. A method of managing bandwidth in a file system having at least one storage device and at least one client interconnected by a network, at least two managers for managing bandwidth associated with the network, the method comprising steps of:
- providing each of said at least two managers residing on one of said at least one storage device or said-at least one client;
- providing each of said at least two managers with an initial quantity of bandwidth;
- receiving a request for a file operation that requires a predetermined quantity of bandwidth;
- evaluating the request to determine if a manager has an available quantity of bandwidth sufficient to support the requested file operation;
- querying another of said at least two managers to determine if said manager has an available quantity of bandwidth;
- requesting said manager allocate said available quantity of bandwidth to said manager, and
- allocating said available quantity of bandwidth to said requesting manager.

29. The method of claim 28 wherein the step of querying another of said at least two managers further comprises the steps of:

determining which criteria to rely upon for selecting an order in which to query said at least two managers;
selecting the order; and
querying said at least two managers in the selected order.

30. A method of managing bandwidth in a file system having at least one storage device and at least one client interconnected by a network, at least two managers for managing bandwidth associated with the network, the method providing the steps of:
- providing each of said at least two managers residing on one of said at least one storage device or said at least one client;
- providing each of said at least two managers with an initial quantity of bandwidth;
- receiving a request for a file operation that requires a predetermined quantity of bandwidth;
- evaluating the request to determine if a manager has an available quantity of bandwidth sufficient to support the requested file operation;
- querying another of said at least two managers to determine if said manager has an available quantity of bandwidth;
- determining whether said another of said at least two managers is requesting available bandwidth;
- evaluating the quantity of available bandwidth that is being requested by each of the said at least two managers;
- requesting the manager allocate said available quantity of bandwidth to said manager; and
- allocating said available quantity from the manager that is requesting the lesser quantity of bandwidth to the manager that is requesting the greater quantity of bandwidth.

31. A file system for a multi-media storage system operable to communicate information over a network with a plurality of clients, said network having an available network bandwidth, the file system comprising:
- said plurality of clients including an admission controller, operable in response to a file request from a multimedia client for a file operation upon a selected file, to control admission of said file request;
- a network storage device having an available disk bandwidth coupled to the network for retrieving and storing file control information and at least one file, said network storage device comprising;
  - a disk manager for managing file maintenance procedures of said network storage device, said disk manager including;
    - a disk status determiner, activable in response to a disk bandwidth request from the admission controller, to determine the available disk bandwidth;
- a network manager located on one of said network storage devices for providing network services, said network manager including a network status table for providing the available network bandwidth in response to a network bandwidth request from the admission controller;
- wherein, said admission controller, in response to said file request, sends said network bandwidth request and said disk bandwidth request to determine whether said available network bandwidth and said available disk bandwidth are sufficient to support the requested file operation.

32. The file system of claim 31 further comprising a system metadata table for providing a disk location of said at least one files, wherein said client queries the system metadata table to determine the disk where the selected file is located.

33. The file system of claim 31 wherein said at least on file manager further,comprises a write lock manager, operable to prevent more than one said at least one client from simultaneously writing to said selected file.

34. The file system of claim 33 wherein the write lock manager further comprises a write circular buffer for storing a write request for said selected file such that said write request is serviced on a first stored first served basis.

35. The file system of claim 33 wherein the write lock manager further comprises a read circular buffer for storing a read request for said selected file such that said read request is serviced on a first stored first served basis.

36. The file system of claim 31 further comprising a network manager mirror corresponding to each of said network managers.

37. A file system for a multi-media storage system operable to communicate information over a network with a plurality of clients, said network having an available network bandwidth, the file system comprising:
  a network storage device having an available disk bandwidth coupled to the network for retrieving and storing file control information and at least one file, said network storage device comprising;
    a disk manager for managing file maintenance procedures of said network storage device, said disk manager including;
      an admission controller, operable in response to a file request from a multimedia client for a file operation upon a selected file, to control admission of said file request;
      a disk status determiner, activable in response to a disk bandwidth request from the admission controller, to determine the available disk bandwidth;
    a network manager located on one of said network storage devices for providing network services, said network manager including a network status table for providing the available network bandwidth in response to a network bandwidth request from the admission controller;
  wherein, said admission controller, in response to said file request, sends said network bandwidth request and said disk bandwidth request to determine whether said available network bandwidth and said available disk bandwidth are sufficient to support the requested file operation.

38. The file system of claim 37 further comprising a system metadata table for providing a disk location of said at least one files, wherein said client queries the system metadata table to determine the disk where the selected file is located.

39. The file system of claim 37 wherein said at least on file manager further comprises a write lock manager, operable to prevent more than one said at least one-client from simultaneously writing to said selected file.

40. The file system of claim 39 wherein the write lock manager further comprises a write circular buffer for storing a write request for said selected file such that said write request is serviced on a first stored first served basis.

41. The file system of claim 39 wherein the write lock manager further comprises a read circular buffer for storing a read request for said selected file such that said read request is serviced on a first stored first served basis.

42. The file system of claim 37 further comprising a network manager mirror corresponding to each of said network mangers.

43. The file system of claim 37 further comprising a cluster manager mirror corresponding to each of said cluster managers.

44. The file system of claim 37 further comprising a security manager for limiting access to said at least one network storage device by said at least one client.

* * * * *

UNITED STATES PATENT AND TRADEMARK OFFICE
CERTIFICATE OF CORRECTION

PATENT NO. : 6,466,978 B1 Page 1 of 1
DATED : November 18, 2003
INVENTOR(S) : Sarit Mukherjee et al.

It is certified that error appears in the above-identified patent and that said Letters Patent is hereby corrected as shown below:

<u>Column 20,</u>
Line 1, "at:" should be -- at --.
Line 53, "each," should be -- each --.

<u>Column 23,</u>
Line 48, "said-at" should be -- said at --.

<u>Column 25,</u>
Line 6, "on" should be -- one --.
Line 7, "further," should be -- further --.

<u>Column 26,</u>
Line 17, "on" should be -- one --.
Line 19, "one-client" should be -- one client --.
Line 31, "mangers" should be -- managers --.

Signed and Sealed this

Thirtieth Day of March, 2004

JON W. DUDAS
*Acting Director of the United States Patent and Trademark Office*